(12) United States Patent
Shental et al.

(10) Patent No.: US 8,139,656 B2
(45) Date of Patent: Mar. 20, 2012

(54) METHOD AND SYSTEM FOR LINEAR PROCESSING OF AN INPUT USING GAUSSIAN BELIEF PROPAGATION

(75) Inventors: Ori Shental, Tzvr Yigal (IL); Danny Dolev, Mevaseret Zion (IL); Danny Bickson, Jerusalem (IL)

(73) Assignee: The Regents of the University of California, Oakland, CA (US)

( * ) Notice: Subject to any disclaimer, the term of this patent is extended or adjusted under 35 U.S.C. 154(b) by 731 days.

(21) Appl. No.: 12/238,197

(22) Filed: Sep. 25, 2008

(65) Prior Publication Data

US 2010/0074342 A1      Mar. 25, 2010

(51) Int. Cl.
*H04L 27/00* (2006.01)
(52) U.S. Cl. ........ 375/259; 375/316; 375/260; 375/267; 375/285; 375/346; 375/347; 375/348; 375/349; 706/52
(58) Field of Classification Search .......... 375/259, 375/316, 260, 267, 285, 346, 347, 348, 349; 706/52
See application file for complete search history.

(56) References Cited

U.S. PATENT DOCUMENTS

| 7,154,965 | B2* | 12/2006 | Zeng et al. ............... 375/340 |
| 7,411,929 | B2* | 8/2008 | Ling et al. ............... 370/334 |
| 2009/0034646 | A1* | 2/2009 | Feller ............... 375/285 |
| 2010/0150274 | A1* | 6/2010 | Dai et al. ............... 375/340 |

OTHER PUBLICATIONS

Bahl, L., Cocke, J., Jelinek, F., Raviv, J., "Optimal Decoding of Linear Codes for Minimizing Symbol Error Rate." IEEE Trans. Inform. Theory, 20 (3) p. 284, Mar. 1974.
Bickson, D., Dolev, D., Weiss, Y., "Modified Belief Propagation Algorithm for Energy Saving in Wireless and Sensor Networks." pp. 1-6, Sep. 2005. Available: http://leibniz.cs.huji.ac.il/tr/842.pdf.
Bickson, D., Dolev, D., Yom-Tov, E., "A Gaussian Belief Propagation Solver for Large Scale Support Vector Machines." pp. 1-9. Available: http://leibniz.cs.huji.ac.il/tr/1050.pdf.
Bickson, D., Malkhi, D., "A Unifying Framework of Rating Users and Data Items in Peer-to-Peer and Social Networks." Peer-to-Peer Netw Appl (PPNA) Journal, Springer-Verlag, (11 pages), Apr. 2008.
Bickson, D., Malkhi, D., Zhou, L., "Peer-to-Peer Rating." 7$^{th}$ IEEE P2P Computing, Galway, pp. 1-8, Ireland, 2007.
Bickson, D., Dolev, D., Shental, O., Siegel, P., Wolf, J., "Gaussian Belief Propagation Based Multiuser Detection." IEEE Int. Symp. on Inform. Theory (ISIT), Toronto, Canada, pp. 1878-1882, Jul. 2008.

(Continued)

*Primary Examiner* — Siu Lee
(74) *Attorney, Agent, or Firm* — Greer, Burns & Crain Ltd.

(57) ABSTRACT

Methods and systems for processing an input. An input vector y is received that represents a noisy observation of Ax, where A is a data matrix and x is a data vector of unknown variables. Data vector x is recovered from the received input vector y via an iterative method. The recovering comprises determining an inference of a vector of marginal means over a graph G, where the graph G is of a joint Gaussian probability density function p(x) associated with noise in the received input vector y.

34 Claims, 7 Drawing Sheets

OTHER PUBLICATIONS

Bickson, D., Dolev, D., Shental, O., Siegel, P., Wolf, J., "Linear Detection via Belief Propagation." Proc. $45^{th}$ Allerton Conf. on Communications, Control and Computing, Monticello, IL, pp. 1207-1213, Sep. 2007.

Frey, B., "Local Probability Propagation for Factor Analysis." Neural Information Processing Systems (NIPS), pp. 442-448, Denver, Colorado, Dec. 1999.

Grant, A., Schlegel, C., "Convergence of Linear Interference Cancellation Multiuser Receivers." IEEE Trans. Commun., 49 (10), pp. 1824-1834, Oct. 2001.

Guo, D., Wang, C., "Asymptotic Mean-Square Optimality of Belief Propagation for Sparse Linear Systems." Proc. $44^{th}$ Allerton Conf. on Communications, Control and Computing, Monticello, IL, pp. 194-198, Sep. 2006.

Johnson, J., Malioutov, D., Willsky, A., "Walk-Sum Interpretation and Analysis of Gaussian Belief Propagation." Advances in Information Processing Systems, 18, pp. 579-586, Cambridge, MA: MIT Press (2006).

Kabashima, Y., "A CDMA Multiuser Detection Algorithm on the Basis of Belief Propagation." J. Phys. A: Math. Gen., 36, pp. 11111-11121, Oct. 2003.

Kschischang, F., Frey, B., Loeliger, H., "Factor Graphs and the Sum-Product Algorithm." IEEE Trans. Inform. Theory, 47 (2), pp. 498-519, Feb. 2001.

Kurkoski, B., Siegel, P., Wolf, J., "Joint Message-Passing Decoding of LDPC Codes and Partial-Response Channels." IEEE Trans. Inform. Theory, 48 (6), pp. 1410-1422, Jun. 2002.

Kurkoski, B., Siegel, P., Wolf, J., "Correction to Joint Message-Passing Decoding of LDPC Codes and Partial-Response Channels." IEEE Trans. Inform. Theory, 49, (8), p. 2076, Aug. 2003.

Leibig, C. Dekorsy, A., Fliege, J., "Power Control using Steffensen Iterations for CDMA Systems with Beamforming or Multiuser Detection." Proc. IEEE International Conference on Communications (ICC), Seoul, Korea, pp. 2323-2327, 2005.

Malioutov, D., Johnson, J., Willsky, A., "Walk-Sums and Belief Propagation in Gaussian Graphical Models." Journal of Machine Research, vol. 7, pp. 2031-2064, Oct. 2006.

Marrow, M., Wolf, J., "Iterative Detection of 2-Dimensional ISI Channels." Proc. IEEE Inform. Theory Workshop (ITW), pp. 131-134, Paris, France, Mar. 2003.

Moallemi, C., Van Roy, B., "Consensus Propagation." IEEE Trans. Inform. Theory, 52 (11), pp. 4753-4766, Nov. 2006.

Moallemi, C., Van Roy, B., "Convergence of the Min-Sum Algorithm for Convex Optimization." Proc. 45th Allerton Conf. on Communication, Control and Computing, Monticello, IL, pp. 840-847, Sep. 2007.

Montanari, A., Tse, D., "Analysis of Belief Propagation for Non-Linear Problems: The Example of CDMA (or: How to Prove Tanaka's Formula)." Proc. IEEE Inform. Theory Workshop (ITW), Punta del Este, Uruguay, (5 pages), Mar. 2006.

Montanari, A., Prabhakar, B., Tse, D., "Belief Propagation Based Multi-User Detection." Proc. $43^{rd}$ Allerton Conf. on Communications, Control, and Computing, Monticello, Illinois, pp. 1-9, Sep. 2005. Available: http://www.citebase.org/abstract?id=oai:arXiv.org:cs/0510044.

Murphy, K., Weiss, Y., Jordan, M., "Loopy Belief Propagation for Approximate Inference: An Empirical Study." Proc. of UAI, (9 pages), 1999.

Neirotti, J., Saad, D., "Efficient Bayesian Inference for Learning in the Ising Linear Perceptron and Signal Detection in CDMA." Physica A, 365, pp. 203-210, Feb. 2006.

Neirotti, J., Saad, D., "Improved Message Passing for Inference in Densely Connected Systems." Europhys. Lett., 71 (5), pp. 866-872, Sep. 2005.

Plarre, K., Kumar, P., "Extended Message Passing Algorithm for Inference in Loopy Gaussian Graphical Models." pp. 1-33, Oct. 2002.

Rusmevichientong, P., Van Roy, B., "An Analysis of Belief Propagation on the Turbo Decoding Graph with Gaussian Densities," IEEE Trans. Information Theory, 47 (2), pp. 745-765, Feb. 2001.

Shental, O., Weiss, A., Shental, N., Weiss, Y., "Generalized Belief Propagation Receiver for Near-Optimal Detection of Two-Dimensional Channels with Memory." Proc. IEEE Inform. Theory Workshop (ITW), pp. 225-229, San Antonio, Texas, Oct. 2004.

Shental, O., Shental, N., Shamai, S., "On the Achievable Information Rates of Finite-State Input Two-Dimensional Channels with Memory." Proc. IEEE Int. Symp. Inform. Theory (ISIT), Adelaide, Australia, (5 pages), Sep. 2005.

Shental, O., Shental, N., Shamai, S., Kanter, I., Weiss, A., Weiss, Y., "Discrete-Input Two-Dimensional Gaussian Channels with Memory: Estimation and Information Rates via Graphical Models and Statistical Mechanics." IEEE Trans. Inform. Theory, 54 (4), pp. 1500-1513, Apr. 2008.

Shental, O., Bickson, D., Siegel, P., Wolf, J., Dolev, D., "Gaussian Belief Propagation for Solving Systems of Linear Equations: Theory and Application." Paper submitted to IEEE Transactions on Information Theory, pp. 1-42, Oct. 2008.

Shental, O., Siegel, P., Wolf, J., Bickson, D., Dolev, D., "Gaussian Belief Propagation Solver for Systems of Linear Equations." IEEE Int. Symp. Inform. Theory (ISIT), Toronto, Canada, (5 pages), Jul. 2008.

Tan, P., Rasmussen, L., "Linear Interference Cancellation in CDMA Based on Iterative Techniques for Linear Equation Systems." IEEE Trans. Commun., 48 (12), pp. 2099-2108, Dec. 2000.

Vojcic, B., Jang, W., "Transmitter Precoding in Synchronous Multiuser Communications." IEEE Trans. Commun., 46 (10), pp. 1346-1355, Oct. 1998.

Weiss, Y., Freeman, W., "Correctness of Belief Propagation in Gaussian Graphical Models of Arbitrary Topology." Neural Computation, 13 (10), pp. 2173-2200, 2001.

Yener, A., Yates, R., Ulukus, S., "CDMA Multiuser Detection: A Nonlinear Programming Approach." IEEE Trans. Commun., 50 (6), pp. 1016-1024, Jun. 2002.

* cited by examiner

METHOD AND SYSTEM FOR LINEAR PROCESSING OF AN INPUT USING GAUSSIAN BELIEF PROPAGATION

STATEMENT OF GOVERNMENT INTEREST

This invention was made with Government assistance under National Science Foundation (NSF) Grant No. CCR-0514859. The Government has certain rights in the invention.

FIELD OF THE INVENTION

The invention relates generally to the field of signal processing. Embodiments of the invention relate more particularly to signal processing for communications.

BACKGROUND OF THE INVENTION

In many areas of science and engineering, such as but not limited to communications, it is desirable to solve a system of linear equations, e.g., to solve Ax=b. Solving such equations, using methods such as inverting matrix A (that is, to provide matrix A'), can be performed either directly or iteratively. However, many conventional processes either require undesirable computational resources, or may not arrive at a useful solution. Often, such solutions are impractical in real-world implementations.

As a nonlimiting example, a signal may be received by a communications device, where the signal corresponds to a data vector. This data vector, in turn, is based on at least a message vector, a data matrix (e.g., due to known communication techniques), and an amount of noise. To determine the message vector from the received data vector, a matrix inversion or similar method can be performed on the received signal. However, for large, sparse, and/or amorphous data matrices, direct methods are impractical due to the need for excessive row reordering operations. Further, the iterative approaches may converge asymptotically to the solution, and thus may converge slowly or not at all.

SUMMARY OF THE INVENTION

Embodiments of the present invention provide, among other things, a method for processing an input. An input vector y is received that represents a noisy observation of Ax, where A is a data matrix and x is a data vector of unknown variables. Data vector x is recovered from the received input vector y via an iterative method. The recovering comprises determining an inference of a vector of marginal means over a graph G, where the graph G is of a joint Gaussian probability density function p(x) associated with noise in the received input vector y.

DETAILED DESCRIPTION

Figure 1:
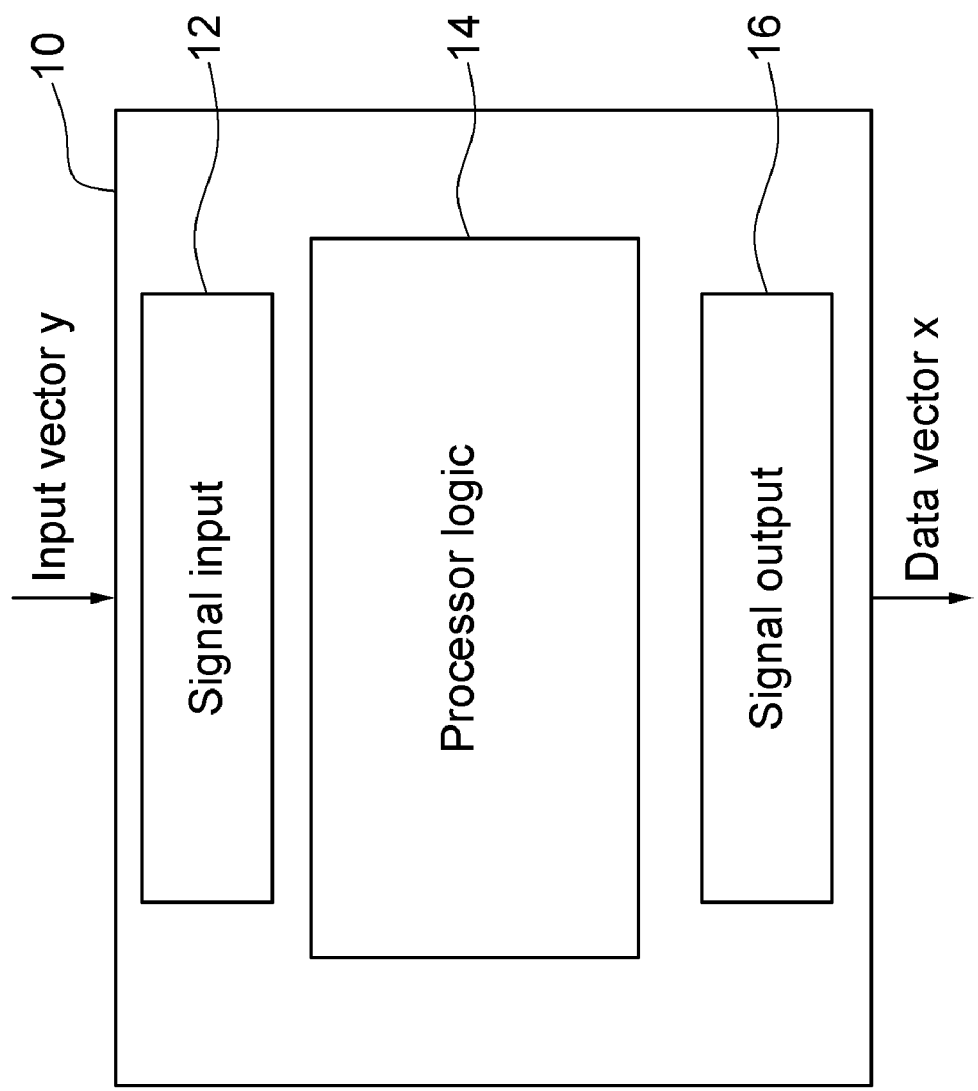
FIG. 1 shows a signal processing device according to an example embodiment of the present invention.

For a system of linear equations Ax=b, given the observation vector $b \in \mathbb{R}^2$, $n \in \mathbb{N}^*$, and the data matrix $A \in \mathbb{R}^{n \times n}$, a unique solution, $x = x^* \in \mathbb{R}^n$, exists if and only if the data matrix A is full rank. For example, consider the case where the data matrices, A, are also symmetric (e.g., as in correlation matrices). Assuming a nonsingular symmetric matrix A, the system of equations can be solved either directly or in an iterative manner. Direct matrix inversion methods, such as but not limited to Gaussian elimination or band Cholesky factorization, find the solution with a finite number of operations, typically, for a dense n×n matrix, on the order of $n^3$. The former is particularly effective for systems with unstructured dense data matrices, while the latter is typically used for structured dense systems.

Iterative methods are inherently simpler, requiring only additions and multiplications, and have the further advantage that they can exploit the sparsity of the matrix A to reduce the computational complexity as well as the algorithmic storage requirements. By comparison, for large, sparse, and amorphous data matrices, the direct methods are impractical due to the need for excessive row reordering operations.

The main drawback of the iterative approach is that, under certain conditions, they converge only asymptotically to the exact solution x*. Thus, there is the risk that they may converge slowly, or not at all. In practice, however, it has been found that they often converge to the exact solution or a good approximation after a relatively small number of iterations. A powerful and efficient iterative algorithm, belief propagation (BP), also known as the sum-product algorithm, has been used very successfully to solve, either exactly or approximately, inference problems in probabilistic graphical models.

According to embodiments of the present invention, an input represented by a linear system of algebraic equations can be solved as a probabilistic inference problem on a suitably-defined graph. A more particular example method of the present invention, Gaussian BP (GaBP), provides an efficient, distributed approach to solving a linear system that circumvents the potentially complex operation of direct matrix inversion.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Generally, embodiments of the present invention provide systems, methods, and/or devices for processing inputs from any system that can be modeled by y=Ax, where y is an n×1 vector of observations, A is a data matrix, for example square (i.e., n×n) or rectangular (i.e., m×n), and x is a n×1 vector of unknowns. Put another way, embodiments of the present invention can process channels where y is a noisy observation of Ax.

FIG. 1 shows a signal processing device 10. Nonlimiting examples of signal processing devices include suitably configured processors, and the present invention is not to be limited to a particular processor configuration. A device having such a processor, including but not limited to computers, communications devices, mobile computing devices, etc. may provide the device 10, and any of various devices may be used. Other embodiments of the present invention include software (on any suitable media), hardware, firmware, propagated signal, etc. that allow a signal processing device, such as but not limited to signal processing device 10, to perform methods of the present invention.

The device 10 includes an input 12 for receiving a signal representing a data input vector. Example inputs include a suitable input signal path, which may be configured to receive a processed signal (via any suitable methods), an unprocessed signal, a partially processed signal, a filtered signal, a partially filtered signal, an unfiltered signal, or any combination thereof. Processing logic 14 for performing methods of the present invention is provided, and such logic may be, as a nonlimiting example, encoded into the signal processing device 10. The processing logic 14 includes logic for recovering a message vector from the data input vector. An output 16 provides a signal representative of a recovered message vector (or, as a nonlimiting embodiment, a signal that can be further processed to provide a recovered message vector without performing matrix inversion). This output signal, as nonlimiting examples, can be displayed on any suitable display, printed on any suitable medium, stored to any suitable medium, stored in memory (e.g., physical or virtual memory), delivered over a network, used as an input for additional processing via any of the above methods, etc.

Generally, the processing logic 14 receives an input vector (e.g., receives a signal corresponding to an input vector) that represents a noisy observation of Ax. A is a data matrix, such as a two-dimensional matrix, either rectangular (e.g., m×n) or square (e.g., n×n). This data matrix A is based on any of various origins, as will be appreciated by one of ordinary skill in the art. Nonlimiting examples are provided herein. Data vector x represents data to be recovered by an example method according to the present invention. This vector x may represent, as a nonlimiting example, a message to be recovered, a solution to a linear algebra problem, or any of various other data vectors.

The input data vector y also includes noise, which for example embodiments of the present invention is assumed to be Gaussian noise, though the invention is not to be limited to this assumption. This noise may be incorporated into data matrix A, and may be separately represented in nonlimiting examples by a noise vector n. Noise can originate from any of a variety of sources, including but not limited to signal noise in communications, or simply unknowns when generating a solution to a linear algebra problem. Thus, it is to be understood that "noise" may be any type of data that may be represented as noise by the equations described herein.

The general goal of embodiments of the present invention is to recover the data vector x from input data vector y. In example embodiments of the present invention, this is done by an iterative method that determines an inference of a vector of marginal means over a graph G, where the graph G is of a joint Gaussian probability density function p(x) associated with noise in the received input vector y. Generally, the graph G includes a set of continuous variable nodes that are in one-to-one correspondence with the vector of unknowns, x, and the set of undirected edges, between variable nodes, is determined by the non-zero entries of the data matrix A. Example methods for recovering data vector x are referred to herein as Gaussian belief propagation (GaBP) methods.

A general description of example Gaussian belief propagation methods follows. In the description, the following notation will be used: the operator $\{\bullet\}^T$ denotes a vector or matrix transpose, the matrix $I_n$ is an n×n identity matrix, while the symbols $\{\bullet\}_i$ and $\{\bullet\}_{ij}$ denote entries of a vector and matrix, respectively.

First, define an undirected graphical model (i.e., a Markov random field) G, corresponding to the linear system of equations. Specifically, let G=(x, ϵ), where x is a set of nodes that are in one-to-one correspondence with the linear system's variables $x=\{x_1, \ldots, x_n\}^T$, and where ϵ is a set of undirected edges determined by the non-zero entries of the (symmetric) matrix A. Using this graph, one can translate the problem of solving the linear system from the algebraic domain to the domain of probabilistic inference, as stated in the following theorem:

The computation of the solution vector x* is identical to the inference of the vector of marginal means $\mu=\{\mu_1, \ldots, \mu_n\}$ over the graph G with the associated joint Gaussian probability density function $$p(x) \sim N(\mu \triangleq A^{-1}b, A^{-1}).$$

Proof: Another way of solving the set of linear equations Ax−b=0 is to represent it by using a quadratic form $$q(x) \triangleq x^T A x/2 - b^T x.$$

As the matrix A is symmetric, the derivative of the quadratic form with respect to the vector x is given by the vector ∂q/∂x=Ax−b. Thus, equating ∂q/∂x=0 gives the stationary point x*, which is nothing but the desired solution to Ax=b.

Next, one can define the following joint Gaussian probability density function $$p(x) \triangleq \mathcal{Z}^{-1}\exp(-q(x)) = \mathcal{Z}^{-1}\exp(-x^T A x/2 + b^T x),$$

where Z is a distribution normalization factor. Denoting the vector $$\mu \triangleq A^{-1}b,$$

the Gaussian density function can be rewritten as $$p(x) = \mathcal{Z}^{-1}\exp\left(\frac{\mu^T A \mu}{2}\right) \times \exp\left(-\frac{x^T A x}{2} + \mu^T A x - \frac{\mu^T A \mu}{2}\right)$$
$$= \zeta^{-1}\exp(-(x-\mu)^T A(x-\mu)/2)$$
$$= \mathcal{N}(\mu, A^{-1}),$$

where the new normalization factor $$\zeta \triangleq \mathcal{Z}\exp(-\mu^T A \mu/2).$$

It follows that the target solution $x^* = A^{-1}b$ is equal to $$\mu \triangleq A^{-1}b,$$

the mean vector of the distribution p(x), as defined above.

Hence, in order to solve the system of linear equations, one needs to infer the marginal densities, which must also be Gaussian, $p(x_i) \sim N(\mu_i = \{A^{-1}b\}_i, P_i^{-1} = \{A^{-1}\}_{ii})$, where $\mu_i$ and $P_i$ are the marginal mean and inverse variance (sometimes called the precision), respectively. Generally speaking, the mean is the average value that the vector of unknowns can get, and the precision is the inverse of the variance (fluctuation) of these values.

According to the above theorem, solving a deterministic vector-matrix linear equation translates to solving an inference problem in the corresponding graph. The move to the probabilistic domain calls for the utilization of BP as an efficient inference engine.

To better illustrate an example GaBP algorithm according to embodiments of the present invention, a belief propagation (BP) method will be first summarized. BP has been found to have outstanding empirical success in many applications, e.g., in decoding Turbo codes and low-density parity-check (LDPC) codes. The excellent performance of BP in these applications may be attributed to the sparsity of the graphs, which ensures that cycles in the graph are long, and inference may be performed as if the graph were a tree.

Given the data matrix A and the observation vector b, one can write explicitly the Gaussian density function, p(x), and its corresponding graph G consisting of edge potentials ('compatibility functions') $\psi_{ij}$ and self potentials ('evidence') $\phi_i$. These graph potentials are simply determined according to the following pairwise factorization of the Gaussian function $$p(x) \propto \Pi_{i=1}^n \phi_i(x_i) \Pi_{\{i,j\}} \psi_{ij}(x_i, x_j),$$

resulting in $$\psi_{ij}(x_i, x_j) \triangleq \exp(-x_i A_{ij} x_j) \text{ and } \phi_i(x_i) \triangleq \exp(b_i x_i - A_{ii} x_i^2 / 2).$$

Note that by completing the square, one can observe that $\phi_i(x_i) \propto N(\mu_{ii} = b_i/A_{ii}, P_{ii}^{-1} = A_{ii}^{-1})$. The graph topology is specified by the structure of the matrix A, i.e., the edges set $\{i,j\}$ includes all non-zero entries of A for which i>j.

The example BP algorithm functions by passing real-valued messages across edges in the graph and includes two computational rules, referred to as the 'sum-product rule' and the 'product rule'. In contrast to some conventional applications of BP, however, an example graphical representation according to nonlimiting embodiments of the present invention resembles a pairwise Markov random field with a single type of propagating message, rather than a factor graph with two different types of messages, originating from either the variable node or the factor node.

Furthermore, in most graphical representations used in the information theory art, the graph nodes are assigned discrete values, whereas example embodiments of the present invention deal with nodes corresponding to continuous variables. Thus, for a graph g composed of potentials $\psi_{ij}$ and $\phi_i$ as previously defined, the conventional sum-product rule becomes an integral product rule, and the message $m_{ij}(x_j)$, sent from node i to node j over their shared edge on the graph, is given by $$m_{ij}(x_j) \propto \int_{x_i} \psi_{ij}(x_i, x_j) \phi_i(x_i) \Pi_{k \in N(i) \setminus j} m_{ki}(x_i) dx_i.$$

The marginals are computed (as usual) according to the product rule $$p(x_i) = \alpha \phi_i(x_i) \Pi_{k \in N(i)} m_{ki}(x_i),$$

where the scalar $\alpha$ is a normalization constant. The set of graph nodes N(i) denotes the set of all the nodes neighboring the ith node. The set N(i)\j excludes the node j from N(i).

Gaussian BP is a special case of continuous BP, where the underlying distribution is Gaussian. Next, example Gaussian update rules are derived by substituting Gaussian distributions into the continuous BP update equations.

An observation is made that the product of Gaussian densities over a common variable is, up to a constant factor, also a Gaussian density. Particularly, let $f_1(x)$ and $f_2(x)$ be the probability density functions of a Gaussian random variable with two possible densities $N(\mu_1, P_1^{-1})$ and $N(\mu_2, P_2^{-1})$, respectively. Then it can be easily shown that their product, $f(x) = f_1(x) f_2(x)$ is, up to a constant factor, the probability density function of a Gaussian random variable with distribution $N(\mu, P^{-1})$, where $$P^{-1} = (P_1 + P_2)^{-1},$$

$$\mu = P^{-1}(P_1 \mu_1 + P_2 \mu_2).$$

Figure 2:
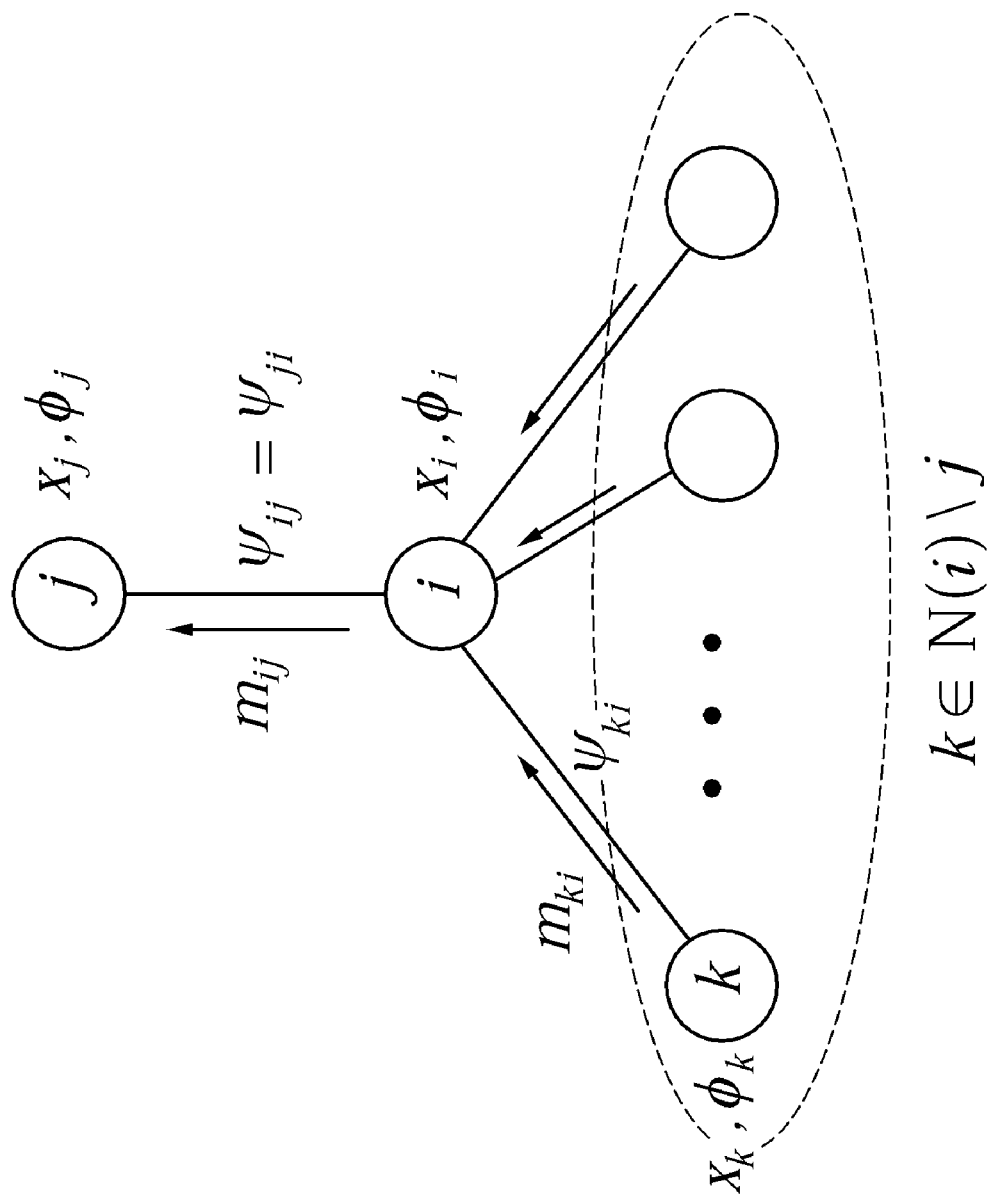
FIG. 2 shows a portion of a node graph.

FIG. 2 plots a portion of a certain graph, describing the neighborhood of node i. Each node (empty circle) is associated with a variable and self potential $\phi$, which is a function of this variable, while edges are identified with the pairwise (symmetric) potentials $\psi$. Messages propagate along its edges in both directions (only the messages relevant for the computation of $m_{ij}$ are shown in FIG. 2).

Looking at the right hand side of the integral-product rule above, node i needs to first calculate the product of all incoming messages, except for the message coming from node j. Recall that since p(x) is jointly Gaussian, the factorized self potentials $\phi_i(x_i) \propto N(\mu_{ii}, P_{ii}^{-1})$ and similarly all messages $m_{ki}(x_i) \propto N(\mu_{ki}, P_{ki}^{-1})$ are of Gaussian form as well.

As the terms in the product of the incoming messages and the self potential in the integral product rule are all a function of the same variable $x_i$ (associated with the node i), then, according to the multivariate extension of the product of Gaussians observation, above, $\phi_i(x_i) \Pi_{k \in N(i) \setminus j} m_{ki}(x_i)$ is proportional to a certain Gaussian distribution, $N(\mu_{i \setminus j}, P_{i \setminus j}^{-1})$. Applying the multivariate version of the product precision expression above, the update rule for the inverse variance is given by (over-braces denote the origin of each of the terms)

$$P_{i \setminus j} = \overbrace{\frac{\phi_i(x_i)}{P_{ii}}} + \sum_{k \in N(i) \setminus j} \overbrace{\frac{m_{ki}(x_i)}{P_{ki}}},$$

where $$P_{ii} \triangleq A_{ii}$$

is the inverse variance a-priori associated with node i, via the precision of $\phi_i(x_i)$, and $P_{ki}$ are the inverse variances of the messages $m_{ki}(x_i)$. Similarly, using the mean equation above for the multivariate case, the mean can be calculated as $$\mu_{i\setminus j} = P_{i\setminus j}^{-1}\left(\frac{\phi_i(x_i)}{P_{ii}\mu_{ii}} + \sum_{k\in N(i)\setminus j} \frac{m_{ki}(x_i)}{P_{ki}\mu_{ki}}\right),$$

where $$\mu_{ii} \stackrel{\Delta}{=} b_i/A_{ii}$$

is the mean of the self potential and $\mu_{ki}$ are the means of the incoming messages.

Next, the remaining terms of the message $m_{ij}(x_j)$ are calculated, including the integration over $x_i$. After some algebraic manipulation, using the Gaussian integral $\int_{-\infty}^{\infty}\exp(-ax^2+bx)dx=\sqrt{\pi/a}\exp(b^2/4a)$, it is found that the messages $m_{ij}(x_j)$ are proportional to a normal distribution with precision and mean $$P_{ij}=-A_{ij}^2 P_{i\setminus j}^{-1},$$

$$\mu_{ij}=-P_{ij}^{-1}A_{ij}\mu_{i\setminus j}.$$

These two scalars represent the messages propagated in the example GaBP-based algorithm.

Finally, computing the product rule is similar to the calculation of the previous product and the resulting mean and precision, but including all incoming messages. The marginals are inferred by normalizing the result of this product. Thus, the marginals are found to be Gaussian probability density functions $N(\mu_i, P_i^{-1})$ with precision and mean $$P_i = \frac{\phi_i(x_i)}{P_{ii}} + \sum_{k\in N(i)} \frac{m_{ki}(x_i)}{P_{ki}},$$

$$\mu_i = P_{i\setminus j}^{-1}\left(\frac{\phi_i(x_i)}{P_{ii}\mu_{ii}} + \sum_{k\in N(i)} \frac{m_{ki}(x_i)}{P_{ki}\mu_{ki}}\right),$$

respectively.

For a dense data matrix, the number of messages passed on the graph can be reduced from $O(n^2)$ messages (i.e., twice the number of edges) down to $O(n)$ messages per iteration round by using the following: instead of sending a unique message composed of the pair of $\mu_{ij}$ and $P_{ij}$ from node i to node j, a node broadcasts aggregated sums to all its neighbors, and consequently each node can retrieve locally $P_{i\setminus y}$ and $\mu_{i\setminus y}$ from the aggregated sums $$\tilde{P}_i = P_{ii} + \sum_{k\in N(i)} P_{ki},$$

$$\tilde{\mu}_i = \tilde{P}_i^{-1}\left(P_{ii}\mu_{ii} + \sum_{k\in N(i)} P_{ki}\mu_{ki}\right)$$

using a subtraction $$P_{i\setminus j}=\tilde{P}_i-P_{ji},$$

$$\mu_{i\setminus j}=\tilde{\mu}_i-P_{i\setminus j}^{-1}P_{ji}\mu_{ji}.$$

The following table shows an example GaBP solver algorithm, as provided in the table below.

TABLE 1

| | | |
|---|---|---|
| 1. Initialize: | ✓ | Set the neighborhood N(i) to include $\forall k \neq i$ such that $A_{ki} \neq 0$. |
| | ✓ | Fix the scalars $P_{ii} = A_{ii}$ and $\mu_{ii} = b_i/A_{ii}, \forall i$. |
| | ✓ | Set the initial i → N(i) broadcast messages $\tilde{P}_i = 0$ and $\tilde{\mu}_i = 0$. |
| | ✓ | Set the initial k → i, k ∈ N(i) internal scalars $P_{ki} = 0$ and $\mu_{ki} = 0$. |
| | ✓ | Set a convergence threshold ∈. |
| 2. Iterate: | ✓ | Broadcast the aggregated sum messages $\tilde{P}_i = P_{ii} + \Sigma_{k\in N(i)} P_{ki}$, $\tilde{\mu}_i = \tilde{P}_i^{-1}(P_{ii}\mu_{ii} + \Sigma_{k\in N(i)} P_{ki}\mu_{ki}), \forall i$ (under chosen scheduling). |
| | ✓ | Compute the i → j, i ∈ N(j) internal scalars $P_{ij} = -A_{ij}^2/(\tilde{P}_i - P_{ji})$, $\mu_{ij} = (\tilde{P}_i\tilde{\mu}_i - P_{ji}\mu_{ji})/A_{ij}$. |
| 3. Check: | ✓ | If the internal scalars $P_{ij}$ and $\mu_{ij}$ did not converge (w.r.t. ∈), return to Step 2. |
| | ✓ | Else, continue to Step 4. |
| 4. Infer: | ✓ | Compute the marginal means $\mu_i = (P_{ii}\mu_{ii} + \Sigma_{k\in N(i)} P_{ki}\mu_{ki})/(P_{ii} + \Sigma_{k\in N(i)} P_{ki}) = \tilde{\mu}_i, \forall i$. |
| | (✓) | Optionally compute the marginal precisions $P_i = P_{ii} + \Sigma_{k\in N(i)} P_{ki} = \tilde{P}_i$) |
| 5. Solve: | ✓ | Find the solution $x_i^* = \mu_i, \forall i$. |

A well-known alternative to the sum-product BP algorithm is the max-product (a.k.a. min-sum) algorithm. In this variant of BP, a maximization operation is performed rather than marginalization, i.e., variables are eliminated by taking maxima instead of sums. For trellis trees (as nonlimiting examples, graphical representation of convolutional codes or ISI channels), the conventional sum-product BP algorithm boils down to performing the BCJR algorithm, resulting in the most probable symbol, while its max-product counterpart is equivalent to the Viterbi algorithm, thus inferring the most probable sequence of symbols.

In order to derive the max-product version of an example GaBP solver, the integral (sum)-product rule is replaced by a new rule $$m_{ij}(x_j) \propto \arg_{x_i} \max \psi_{ij}(x_i,x_j)\phi_i(x_i)\Pi_{k\in N(i)\setminus j} m_{ki}(x_i).$$

Computing $m_{ij}(x_j)$ according to this max-product rule, one gets $$m_{ij}(x_j) \propto N(\mu_{ij}=-P_{ij}^{-1}A_{ij}\mu_{i\setminus j}, P_{ij}^{-1}=-A_{ij}^{-2}P_{i\setminus j}),$$

which is identical to the messages derived for the sum-product case. Thus, it can be shown that the max-product and sum-product version of the example GaBP solver are identical.

In ordinary BP, convergence does not guarantee exactness of the inferred probabilities, unless the graph has no cycles. Advantageously, this is not the case with example GaBP solvers of the present invention. Its underlying Gaussian nature yields a direct connection between convergence and exact inference. Moreover, in contrast to conventional BP, the convergence of GaBP in example methods is not limited to acyclic or sparse graphs and can occur even for dense (fully-connected) graphs, adhering to certain rules.

For example, one can use known probabilistic inferences in graphical models to help determine the convergence and exactness properties of the example GaBP solver. The following two theorems establish sufficient conditions under which GaBP will always converge to the exact marginal means.

I. If the matrix A is strictly diagonally dominant (i.e., $|A_{ii}|>\Sigma_{j\neq i}|A_{ij}|,\forall_i$), then GaBP converges and the marginal means converge to the true means. This sufficient condition can be relaxed to include a wider group of matrices.

II. If the spectral radius (i.e., the maximum of the absolute values of the eigenvalues) ρ of the matrix $|I_n-A|$ satisfies $\rho(|I_n-A|)<1$, then GaBP converges and the marginal means converge to the true means.

However, there are many examples of linear systems that violate these conditions for which the example GaBP solver nevertheless converges to the exact solution. As one nonlimiting example, if the graph corresponding to the system is acyclic (i.e., a tree), the example GaBP yields the exact marginal means (and even marginal variances), regardless of the value of the spectral radius.

Further speed-up of the GaBP solver can be achieved by adopting known acceleration techniques from linear algebra. Table 2 demonstrates the speed-up of an example GaBP solver obtained by using such an acceleration method, termed Steffensen's iterations (P. Henrici, Elements of Numerical Analysis, New York: John Wiley and Songs, 1964), in comparison with the accelerated Jacobi algorithm (e.g., as disclosed in O. Axelsson, Iterative Solution Methods, Cambridge, UK: Cambridge University Press, 1994) (diverged for the 4 users setup). This provides a unique setup using an acceleration method within the framework of message-passing algorithms. Further, the region of convergence of the example accelerated GaBP solver remains unchanged.

TABLE 2

| Algorithm | Iterations t ($R_{n=3}$) | Iterations t ($R_{n=4}$) |
|---|---|---|
| Jacobi | 111 | 24 |
| GS | 26 | 26 |
| Parallel GaBP | 23 | 24 |
| Optimal SOR | 17 | 14 |
| Serial GaBP | 16 | 13 |
| Jacobi + Steffensen | 59 | — |
| Parallel GaBP + Steffensen | 13 | 13 |
| Serial GaBP + Steffensen | 9 | 7 |

Having presented a general processing algorithm according to embodiments of the present invention, more particular examples will be provided. However, these examples are not intended to limit the methods and systems of the present invention to the particular methods or devices disclosed herein.

One such example application is communications. As explained above, the underlying essence of estimation theory is to detect a hidden input to a channel from its observed noisy output. The channel can be represented as a certain graphical model, while the detection of the channel input is equivalent to performing inference in the corresponding graph. However, although particular examples described herein are directed to estimation-theoretic problems and applications from the field of communications, methods of the present invention are broadly applicable to problems of efficient distributed matrix inversion, solution of systems of linear equations, and determinant calculation, and methods, devices, and systems for solving such problems are examples of embodiments of the present invention.

Figure 3:
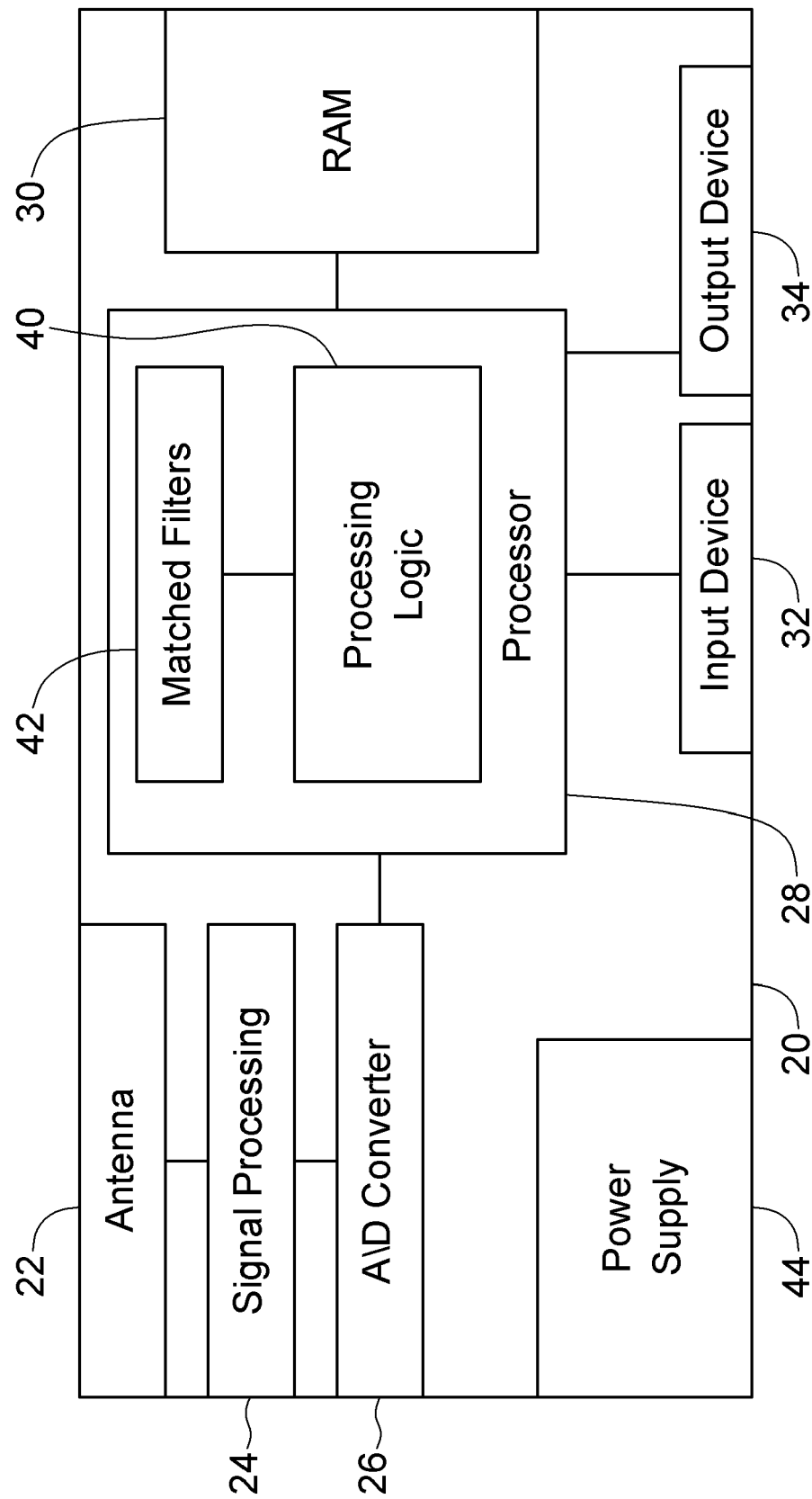
FIG. 3 an example communication device, according to an embodiment of the present invention.

BP has been proven beneficial in various applications in communications. Applications of processing devices, methods, and/or systems of the present invention include, but are not limited to, processing communication signals. FIG. 3 shows an example communication device 20, which may be any device, portable or non-portable, which can perform methods according to the present invention. Nonlimiting examples include mobile telephones, portable computing devices, receivers, servers, clients, network devices, and/or personal computers. The communication device 20 includes at least one antenna 22 for receiving wireless signals. One or more signal conditioners 24 and analog/digital converters 26 may be used to process the received signal, as is well known in the art. A processor 28 controls functions of the communication device 20, and suitable memory 30 and input devices 32 (e.g., a keypad or touchscreen) and output devices 34 (e.g., a display or transmitter) may be provided for device use.

An input data signal is supplied to the processor 28, which in a nonlimiting example is suitably configured to perform methods of the present invention. The processor 28 may be one processor, or may be several processors configured to perform particular methods of the present invention. In addition to logic 40 for performing the data recovery as discussed above, one or more filters (e.g., matched filters) 42 may be provided, depending on the type of wireless communication performed. A suitable power supply 44 is provided, and suitable coupled to the various components of the communication device 20.

One nonlimiting example of communication signal uses code division multiple access (CDMA), the details of which will be understood by those of ordinary skill in the art. For randomly-spread code-divisional multiple-access (CDMA) in the large-system limit, a tractable BP-based multiuser detection (MUD) scheme has been employed, which exhibits near-optimal error performance for binary-input additive white Gaussian noise (BI-AWGN) channels. This message-passing scheme has been extended to the case where the ambient noise level is unknown. As for sub-optimal detection, the nonlinear soft parallel interference cancellation (PIC) detector has been reformulated as an approximate BP solution to the MUD problem.

CDMA may include, e.g., K users and spreading codes of length N. In an example signal processing algorithm according to embodiments of the present invention, the received signal can be represented by r=Sx+n, where r is the N-length vector of received samples at an antenna, S is the N×K spreading codes matrix, in which each user has its own dedicated spreading code=column in the matrix, and n is the n-length additive vector, such as but not limited to a white Gaussian noise vector.

A matched filter S' (e.g., at a front end of a receiver, as will be understood by one of ordinary skill in the art) can be used to filter the samples to get y=S'r=S'Sx+S'n=Rx+z. (In this example, S' indicates a conjugate-transpose operator of S.) In this equation, y is the K-length vector of observations, R is the spreading code's cross-correlation matrix (K×K matrix), and z is the K-length colored noise vector. This corresponds to the general GaBP model above, where A=R and n=K.

An example embodiment of the present invention can be used for efficient and distributed implementation of a detector $A^{-1}y$ (a decorrelator). Other example detectors provided under embodiments of the present invention include detectors that are implemented via matrix inversion, such as but not limited to linear minimum mean squared error (MMSE) detectors.

Another example system according to embodiments of the present invention is a multiple input multiple output (MIMO) system. For example, consider a system with l transmitting antennas and m receiving antennas (for example, the communications device 20 may have multiple receiving antennas). Here, r=Hx+n, where r is the m-length vector of symbols received in m antennas, H is the m×l matrix of channel paths, where each entry denotes the gain of the effective channel between a certain $T_x$ transmitting antenna out of the l antennas and a certain $R_x$ receiving antenna out of the m receiving antennas, and n is a noise vector, such as but not limited to an m-length additive white Gaussian noise vector.

As with the CDMA example above, an example embodiment of the present invention uses a matched filter H', which is a front end of MIMO receivers, as will be appreciated by one of ordinary skill in the art. The matched filter provides y=H'r=H'Hx+H'n=Rx+z, where y is the m-length vector of observations, R is the cross-correlation matrix (e.g., an m×m matrix), and z is an m-length colored noise vector. Again, the general Gaussian model above is applicable, with A=R and n=m.

Yet another example system, device, and method according to embodiments of the present invention processes signals using orthogonal frequency division multiplexing (OFDM). Processing this signal provides y=Gx, where x is a K-length vector of information bits, G is a K×K system matrix, and y is a K-length observed vector. K, as a non-limiting example, is between 512-8192, sufficiently large to allow an efficient matrix inversion algorithm.

Still another example system, device, and method according to embodiments of the present invention processes signals using intersymbol interference (ISI) equalization. Similar to CDMA, ISI uses a correlation matrix (R), but these are interferences of time as opposed to interference among users. This signal processing method compensates for interference cause delayed replicas of the same transmitted symbol (e.g., due to reflections from large objects, such as but not limited to mountains, buildings, etc.).

In contrast to the dense, fully-connected nature of the graphical model of the non-orthogonal CDMA channel, a one-dimensional (1-D) ISI channel can be interpreted as a cycle-free tree graph. Thus, detection in 1-D ISI channels (termed equalization) can be performed in an optimal maximum a-posteriori (MAP) manner via BP, also known in this context as the forward/backward, or BCJR, algorithm. Further, an iterative BP-like detection algorithm for 1-D ISI channels has been proposed that uses a parallel message-passing schedule and achieves near-optimal performance.

For the intermediate regime of non-dense graphs but with many relatively short loops, extensions of BP to two-dimensional ISI channels have been considered, and more recently, the near-optimality of a generalized version of BP for such channels has been demonstrated. Further, BP has been proven to asymptotically achieve optimal MAP detection for sparse linear systems with Gaussian noise, for example, in CDMA with sparse spreading codes.

An important class of practical sub-optimal detectors is based on linear detection. This class includes, for instance, the conventional single-user matched filter (MF), decorrelator (aka zero-forcing equalizer), linear minimum mean-squared error (MMSE) detector, and many other detectors with widespread applicability. In general, linear detection can be viewed as the solution to a (deterministic) set of linear equations describing the original (probabilistic) estimation problem. The mathematical operation behind linear detection extends to other tasks in communication, such as but not limited to channel precoding at the transmitter.

However, in spite of its significant role in estimation theory, linear detection has never been explicitly linked to BP, in contrast to optimal MAP detection and several sub-optimal nonlinear detection techniques. Embodiments of the present invention use a general linear detection reformulated as a GaBP algorithm. This message-passing framework is not limited to the large-system limit and is suitable for channels with arbitrary prior input distribution. Revealing this missing link allows for a distributed implementation of the linear detector, circumventing the necessity of (potentially cumbersome) matrix inversion (via, e.g., Gaussian elimination).

GaBP is shown to yield faster convergence than conventional methods of solving systems of linear equations. BP-based MUD, recently derived and analyzed for Gaussian input symbols, is an instance of a larger overall framework. GaBP convergence can be further accelerated.

Consider a discrete-time channel with a real input vector $x=\{x_1, \ldots, x_K\}^T$ governed by an arbitrary prior distribution, $P_x$, and a corresponding real output vector $y=\{y_1, \ldots, y_K\}^T = f\{x^T\} \in \mathbb{R}^K$ (an extension to the complex domain is straightforward.) Here, the function $f\{\bullet\}$ denotes the channel transformation. By definition, linear detection compels the decision rule to be $$\hat{x} = \Delta\{x^*\} = \Delta\{A^{-1}b\},$$

where b=y is the K×1 observation vector, and the K×K matrix A is a positive-definite symmetric matrix approximating the channel transformation. The vector $x^*$ is the solution (over $\mathbb{R}$) to Ax=b. Estimation is completed by adjusting the (inverse) matrix-vector product to the input alphabet, dictated by $P_x$, accomplished by using a proper clipping function $\Delta\{\bullet\}$ (e.g., for binary signaling $\Delta\{\bullet\}$ is the sign function).

For example, linear channels, which appear extensively in many applications in communication and data storage systems, are characterized by the linear relation $$y = f\{x\} = Rx + n,$$

where n is a K×1 additive noise vector and $R = S^T S$ is a positive-definite symmetric matrix, often known as the correlation matrix. The N×K matrix S describes the physical channel medium, while the vector y corresponds to the output of a bank of filters matched to the physical channel S.

Note that, due to the vast applicability of linear channels, example experiments described herein are directed to such channels, though the invention is not to be limited to this case. Assuming linear channels with AWGN with variance $\sigma^2$ as the ambient noise, the general linear detection rule in the equation above can describe known linear detectors. For example:

The conventional matched filter (MF) detector is obtained by taking $$A \triangleq I_K$$

and b=y. This detector is optimal, in the MAP-sense, for the case of zero cross-correlations, i.e., $R=I_K$, as happens for orthogonal CDMA or when there is no ISI effect.

The decorrelator (zero forcing equalizer) is achieved by substituting $$A \triangleq R$$

and b=y. It is optimal in the noiseless case.

The linear minimum mean-square error (MMSE) detector can also be described by using $A = R + \sigma^2 I_K$ and b=y. This detector is known to be optimal when the input distribution $P_x$ is Gaussian.

In general, linear detection is suboptimal because of its deterministic underlying mechanism (i.e., solving a given set of linear equations), in contrast to other estimation schemes, such as MAP or maximum likelihood, that emerge from an optimization criterion.

Linear detection can be implemented in its general form in an efficient message-passing fashion. Again, the aim is to find x*, a solution to the linear equation Ax=b, i.e., x*=A$^{-1}$b, without actually inverting the nonsingular matrix A. Another way of solving this set of linear equations Ax−b=0 is to represent it using a quadratic form $$q(x) \triangleq x^T A x / 2 - b^T x.$$

As the matrix A is symmetric (e.g., A=S$^T$S), the derivative of the quadratic form with respect to the vector x is given by q'(x)=Ax−b. (For a non-symmetric matrix A an approximation of the solution x* is inferred.)

Thus, equating q'(x)=0 gives the global minimum x* of this convex function, which is nothing but the desired solution to Ax=b.

Now, one can define the following jointly Gaussian distribution $$p(x) \triangleq \mathcal{Z}^{-1} \exp(-q(x)) = \mathcal{Z}^{-1} \exp(-x^T A x / 2 + b^T x),$$

where Z is a distribution normalization factor. Defining the vector $$\mu \triangleq A^{-1} b,$$

one gets the form $$p(x) = \mathcal{Z}^{-1} \exp\left(\frac{\mu^T A \mu}{2}\right) \times \exp\left(-\frac{x^T A x}{2} + \mu^T A x - \frac{\mu^T A \mu}{2}\right)$$
$$= \zeta^{-1} \exp\left(-\frac{1}{2}(x-\mu)^T A (x-\mu)\right)$$
$$= \mathcal{N}(\mu, A^{-1}),$$

where the new normalization factor $$\zeta \triangleq \mathcal{Z} \exp(-\mu^T A \mu / 2).$$

To summarize to this point, the target solution x*=A$^{-1}$b is equal to $$\mu \triangleq A^{-1} b,$$

which is the mean vector of the distribution p(x), as defined above.

The formulation above allows the linear detection problem to shift from an algebraic to a probabilistic domain. Instead of solving a deterministic vector-matrix linear equation, example methods of the present invention solve an inference problem in a graphical model describing a certain Gaussian distribution function. Given the overall channel matrix A and the observation vector b, one knows how to explicitly write p(x) and the corresponding graph G with edge potentials (compatibility functions) $\psi_{i,j}$ and self-potentials ('evidence') $\phi_i$. These graph potentials are determined according to the following pairwise factorization of the Gaussian distribution p(x):

$$p(x) \propto \prod_{i=1}^{K} \phi_i(x_i) \prod_{\{i,j\}} \psi_{ij}(x_i, x_j),$$

resulting in $$\psi_{ij}(x_i, x_j) \triangleq \exp(-x_i A_{ij} x_j)$$

and $\phi_i(x_i)=\exp(b_i x_i - A_{ii} x_i^2/2)$. The set of edges {i,j} corresponds to the set of all non-zero entries of A for which i>j. Hence, it is useful to calculate the marginal densities, which must also be Gaussian, $p(x_i) \sim N(\mu_i=\{A^{-1}b\}_i, P_i^{-1}=\{A^{-1}\}_{ii})$, where $\mu_i$ and $P_i$ are the marginal mean and inverse variance (aka precision), respectively. Recall that, according to the description above, the inferred mean u, is identical to the desired solution $x_i^*$.

The move to the probabilistic domain calls for the utilization of BP as an efficient inference engine. The sum-product rule of BP for continuous variable, required in this example case, is given by $$m_{ij}(x_j) = \alpha \int_{x_i} \psi_{ij}(x_i, x_j) \phi_i(x_i) \Pi_{k \in N(i) \setminus j} m_{ki}(x_i) dx_i,$$

where $m_{ij}(x_j)$ is the message sent from node i to node j over their shared edge on the graph, scalar α is a normalization constant, and the set N(i)\j denotes all the nodes neighboring $x_i$, except $x_j$. The marginals are computed according to the product rule $$p(x_i) = \alpha \phi_i(x_i) \Pi_{k \in N(i)} m_{ki}(x_i).$$

As stated above, GaBP is a special case of continuous BP where the underlying distribution is Gaussian. The GaBP update rules are derived by substituting Gaussian distributions in the continuous BP equations.

According to the right-hand side of the sum-product rule, node i needs to calculate the product of all incoming messages, except for the message coming from node j. Recall that since p(x) is jointly Gaussian, the self-potentials $\phi_i(x_i)$ and the messages $m_{ki}(x_i)$ are Gaussians as well. The product of Gaussians of the same variable is also a Gaussian. Consider the Gaussians defined by $N(\mu_1, P_1^{-1})$ and $N(\mu_2, P_2^{-1})$. Their product is also a Gaussian $N(\mu, P^{-1})$ with $$\mu = P^{-1}(P_1 \mu_1 + P_2 \mu_2),$$

$$P^{-1} = (P_1 + P_2)^{-1}.$$

As the terms in the product of the incoming messages and the self-potential are all describing the same variable, $x_i$, this property can be used to demonstrate that $\phi_i(x_i) \Pi_{k \in N(i) \setminus j} m_{ki}(x_i)$ is proportional to a $N(\mu_{i \setminus j}, P_{i \setminus j}^{-1})$ distribution. Therefore, the update rule for the inverse variance is given by (over-braces denote the origin of these terms)

$$P_{i \setminus j} = \overbrace{\frac{\phi_i(x_i)}{P_{ii}}} + \sum_{x_k \in N(i) \setminus j} \overbrace{\frac{m_{ki}(x_i)}{P_{ki}}},$$

where $$P_{ii} \triangleq A_{ii}$$

is the inverse variance associated with node i, via $\phi_i(x_i)$, and $P_{ki}$ are the inverse variances of the messages $m_{ki}(x_i)$. Equivalently, one can calculate the mean $$\mu_{i\backslash j} = P_{i\backslash j}^{-1}\left(\frac{\phi_i(x_i)}{P_{ii}\mu_{ii}} + \sum_{k\in N(i)\backslash j}\frac{m_{ki}(x_i)}{P_{ki}\mu_{ki}}\right)$$

where $\mu_{ii} \triangleq b_i / A_{ii}$.

Now, one can calculate the remaining terms of the message $m_{ij}(x_j)$, including the integration over $x_i$. After some algebraic manipulations, the Gaussian integral $\int_{-\infty}^{\infty}\exp(-ax^2-bx)dx = \sqrt{\pi/a}\exp(b^2/4a)$ can be used to show that $m_{ij}(x_j)$ is a normal distribution with mean and precision given by $$\mu_{ij}=-P_{ij}^{-1}A_{ij}\mu_{i\backslash j},$$

$$P_{ij}=-A_{ij}P_{i\backslash j}^{-1}A_{ji}.$$

These two scalars are the propagating messages in this example GaBP scheme. Finally, the computation of the product rule is similar to previous calculations, but with no incoming messages excluded. The GaBP-based implementation of the linear detection operation is summarized in Table 3 below.

TABLE 3

| # | Stage | Operation |
|---|---|---|
| 1. | Initialize | Compute $P_{ii} = A_{ii}$ and $\mu_{ii} = b_i/A_{ii}$. |
|   |   | Set $P_{ki} = 0$ and $\mu_{ki} = 0$, $\forall k \neq i$. |
| 2. | Iterate | Propagate $P_{ki}$ and $\mu_{ki}$, $\forall k \neq i$ such that $A_{ki} \neq 0$. |
|   |   | Compute $P_{i\backslash j} = P_{ii} + \Sigma_{k\in N(i)\backslash j} P_{ki}$ and |
|   |   | $\mu_{i\backslash j} = P_{i\backslash j}^{-1}(P_{ii}\mu_{ii} + \Sigma_{k\in N(i)\backslash j} P_{ki}\mu_{ki})$. |
|   |   | Compute $P_{ij} = -A_{ij}P_{i\backslash j}^{-1}A_{ji}$ and $\mu_{ij} = -P_{ij}^{-1}A_{ij}\mu_{i\backslash j}$. |
| 3. | Check | If $P_{ij}$ and $\mu_{ij}$ did not converge, return to #2. Else, continue to #4. |
| 4. | Infer | $P_i = P_{ii} + \Sigma_{k\in N(i)} P_{ki}$, $\mu_i = P_i^{-1}(P_{ii}\mu_{ii} + \Sigma_{k\in N(i)} P_{ki}\mu_{ki})$. |
| 5. | Decide | $\hat{x}_i = \Delta\{\mu_i\}$ |

The algorithm in Table 3 can be easily distributed. Each node i receives as an input the i'th row (or column) of the matrix A and the scalar $b_i$. In each iteration, a message containing two reals, $\mu_{ij}$ and $P_{ij}$, is sent to every neighboring node through their mutual edge, corresponding to a non-zero $A_{ij}$ entry. For a dense matrix A, each of K nodes sends a unique message to every other node on the fully-connected graph, which results in a total of $K^2$ messages per iteration round.

The number of messages passes on the graph can be reduced significantly, down to only K messages per round. Instead of sending a message composed of the pair $\mu_{ij}$ and $P_{ij}$, a node can broadcast the aggregated sums $$\tilde{P}_i = P_{ii} + \Sigma_{k\in N(i)} P_{ki},$$

$$\tilde{\mu}_i = P_i^{-1}(P_{ii}\mu_{ii} + \Sigma_{k\in N(i)} P_{ki}\mu_{ki}).$$

Now, each node locally retrieves the $P_{i\backslash j}$ and $\mu_{i\backslash j}$ from the sums by means of a subtraction $$P_{i\backslash j} = \tilde{P}_i - P_{ji},$$

$$\mu_{i\backslash j} = \tilde{\mu}_i - P_{i\backslash j}^{-1} P_{ji}\mu_{ji}.$$

The rest of the algorithm remains the same.

Again, if it converges, this example GaBP method is known to result in exact inference. One sufficient (but not necessary) condition is that GaBP converges when the spectral radius satisfies $\rho(|I_K-A|)<1$. A stricter sufficient condition determines that the matrix A must be diagonally dominant (i.e., $|A_{ii}|>\Sigma_{j\neq i}|A_{ij}|, \forall i$) in order for GaBP to converge.

As these conditions are not necessary, one can find examples of channels for which the conditions do not hold, yet GaBP still converges perfectly to the linear detection solution. For instance, in the case of Gaussian input signaling, i.e., $P_x$ is a normal distribution, for which linear detection becomes optimal, it can be easily shown that the example GaBP scheme boils down to the BP-based MUD scheme, disclosed in A. Montanari, B. Prabhakar, and D. Tse, "Belief propagation based multi-user detection" in Proc. 43$^{rd}$ Allerton Conf. on Communications, Control and Computing, Monticello, Ill., USA, September 2005. This BP scheme, tailored for Gaussian signaling, has been proven to converge to the minimum mean square error (MMSE) (and optimal) solution for any arbitrarily loaded $$\left(\text{i.e. } \rho(|I_K - R|) \lesseqgtr 1\right)$$

randomly-spread CDMA system (for non-Gaussian signaling, e.g., binary, this BP-based detector is conjectured to converge only in the large-system limit, i.e., as K,N→∞). Thus, Gaussian-input AWGN-CDMA is an example where the example GaBP scheme converges to the MAP decision for any N×K random spreading matrix S.

It can be shown that, when it converges, GaBP is substantially faster than alternative iterative methods. Two system setups of binary signaling synchronous CDMA were examined with cross-correlation matrices $$R_3 = \frac{1}{7}\begin{pmatrix} 7 & -1 & 3 \\ -1 & 7 & -5 \\ 3 & -5 & 7 \end{pmatrix} \text{ and}$$

$$R_4 = \frac{1}{7}\begin{pmatrix} 7 & -1 & 3 & 3 \\ -1 & 7 & 3 & -1 \\ 3 & 3 & 7 & -1 \\ 3 & -1 & -1 & 7 \end{pmatrix}$$

for K=3 and K=4 users, respectively. These correlation profiles are created by using Gold spreading sequences of length N=7. These particular settings were taken from the simulation setup disclosed in A. Yener, R. D. Yates, and S. Ulukus, "CDMA multiuser detection: A nonlinear programming approach," IEEE Trans. Commun., vol. 50, no. 6, pp. 1016-1024, June 2002. Note that $R_3$ and $R_4$ are not diagonally dominant, but their spectral radii are less than unity, namely $\rho(|I_3-R_3|)=0.9008<1$ and $\rho(|I_4-R_4|)=-0.8747<1$, respectively. Hereafter, the iterative methods being compared, including GaBP, implement a decorrelator ($R^{-1}y$) detector in a noiseless channel.

Table 4 compares the example GaBP algorithm with standard iterative solution methods as disclosed in O. Axelsson, Iterative Solution Methods, Cambridge, UK: Cambridge University Press, 1994 (using random initial guesses), previously employed for CDMA MUD.

TABLE 4

| Algorithm | $R_3$ | $R_4$ |
| --- | --- | --- |
| Jacobi | 136 | 50 |
| GS | 27 | 32 |
| GaBP | 23 | 24 |
| SOR | 18 | 20 |
| Serial GaBP | 16 | 13 |

Multiuser detectors based on the algorithms of Jacobi, Gauss-Seidel (GS) and (optimally weighted) successive over-relaxation (SOR) were investigated. The table lists the convergence rates for the two Gold code-based CDMA settings. Convergence is identified and declared when the differences in all the iterated values are less than $10^{-6}$. Clearly, the example GaBP yields faster convergence speed on both examined systems in comparison with the Jacobi and GS algorithms. The best convergence rate with respect to the conventional iterative methods, including SOR, is achieved for serial GaBP, i.e., the example scheme with serial, rather than parallel (flooding), message-passing update rule.

Further speed-up of GaBP can be achieved by adopting known acceleration techniques, like Aitken's method and Steffensen's iterations, for example as disclosed in P. Henrici, Elements of Numerical Analysis, John Wiley and Sons, 1964, yet to be employed with BP schemes. Consider a sequence $\{x_n\}$ (e.g., obtained by using GaBP iterations) linearly converging to the limit $\hat{x}$, and $x_n \neq \hat{x}$ for $n \geq 0$. According to Aitken's method, if there exists a real number a such that $|a|<1$ and $\lim_{n\to\infty}(x_n-\hat{x})/(x_{n-1}-\hat{x})=a$, then the sequence $\{y_n\}$ defined by $$y_n = x_n - \frac{(x_{n+1} - x_n)^2}{x_{n+2} - 2x_{n-1} + x_n}$$

Converges to $\hat{x}$ faster than $\{x_n\}$ in the sense that $\lim_{n\to\infty}|(\hat{x}-y_n)/(\hat{x}-x_n)|=0$. Aitken's method can be viewed as a generalization of over-relaxation, since one uses values from three, rather than two, consecutive iteration rounds. This method can be easily implemented in GaBP as every node computes values based only on its own history.

Steffensen's iterations encapsulate Aitken's method. Starting with $x_n$, two iterations are run to get $x_{n+1}$ and $x_{n+2}$. Next, Aitken's method is used to compute $y_n$, this value is replaced with the original $x_n$, and GaBP is executed again to get a new value of $x_{n+1}$. This process is repeated iteratively until convergence. Table 5 demonstrates the speed-up of GaBP using these acceleration methods, in comparison with the modified Jacobi algorithm.

TABLE 5

| Algorithm | $R_3$ | $R_4$ |
| --- | --- | --- |
| Jacobi + Aitkens | 46 | 33 |
| Jacobi + Steffensen[6] | 51 | — |
| GaBP + Steffensen | 13 | 13 |
| Serial GaBP + Steffensen | 9 | 7 |

Figure 4:
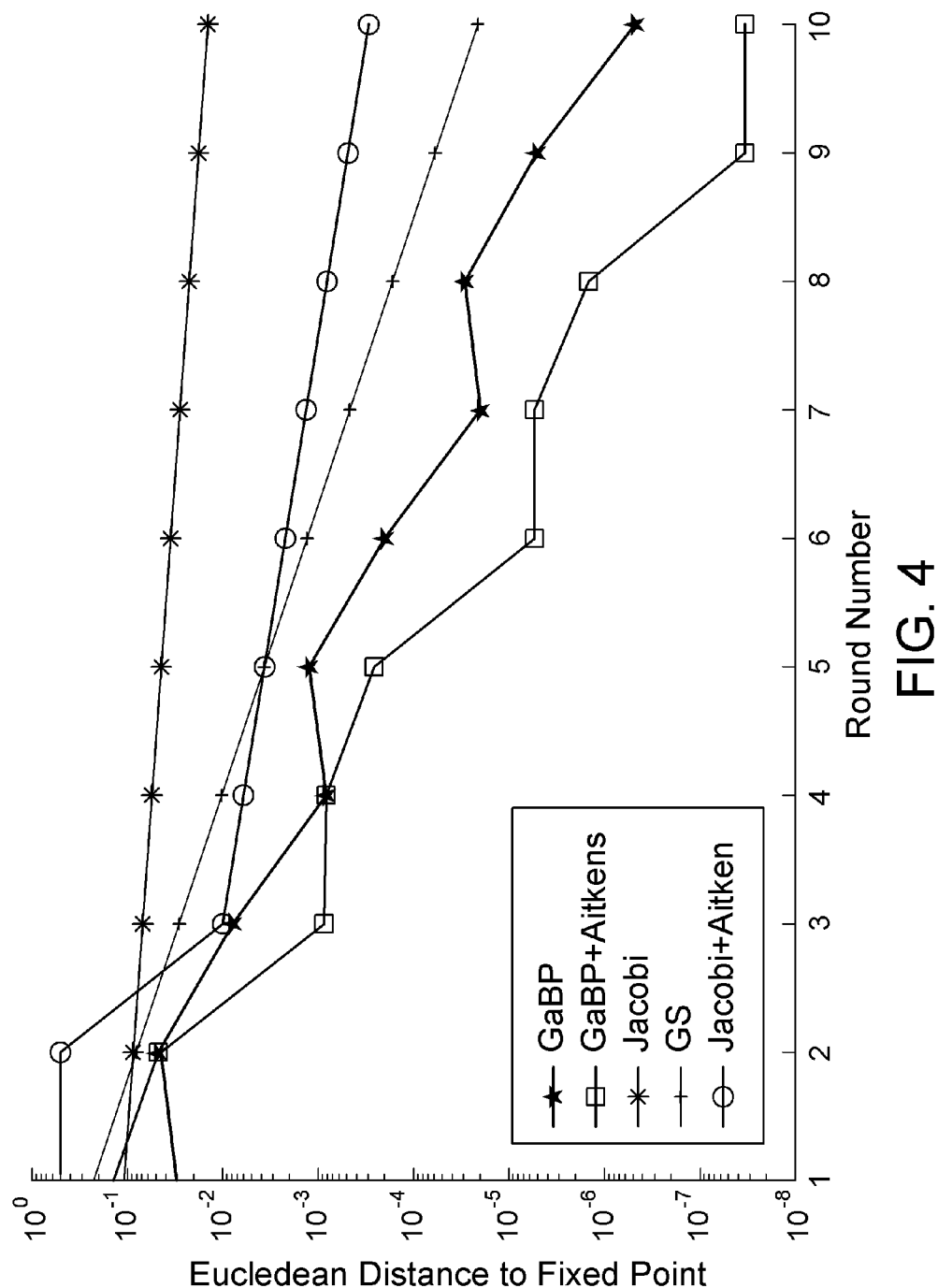
FIG. 4 displays Euclidean distance between intermediate results and a fixed-point solution as a function of iteration rounds, for various solver algorithms.

FIG. 4 displays the Euclidean distance between the tentative (intermediate) results and the fixed-point solution as a function of the iteration rounds, for the algorithms examined. As expected, all linear algorithms exhibit a logarithmic convergence behavior. Note that GaBP converges faster on average, although there are some fluctuations in the GaBP curves, in contrast to the monotonicity of the other curves.

Figure 5:
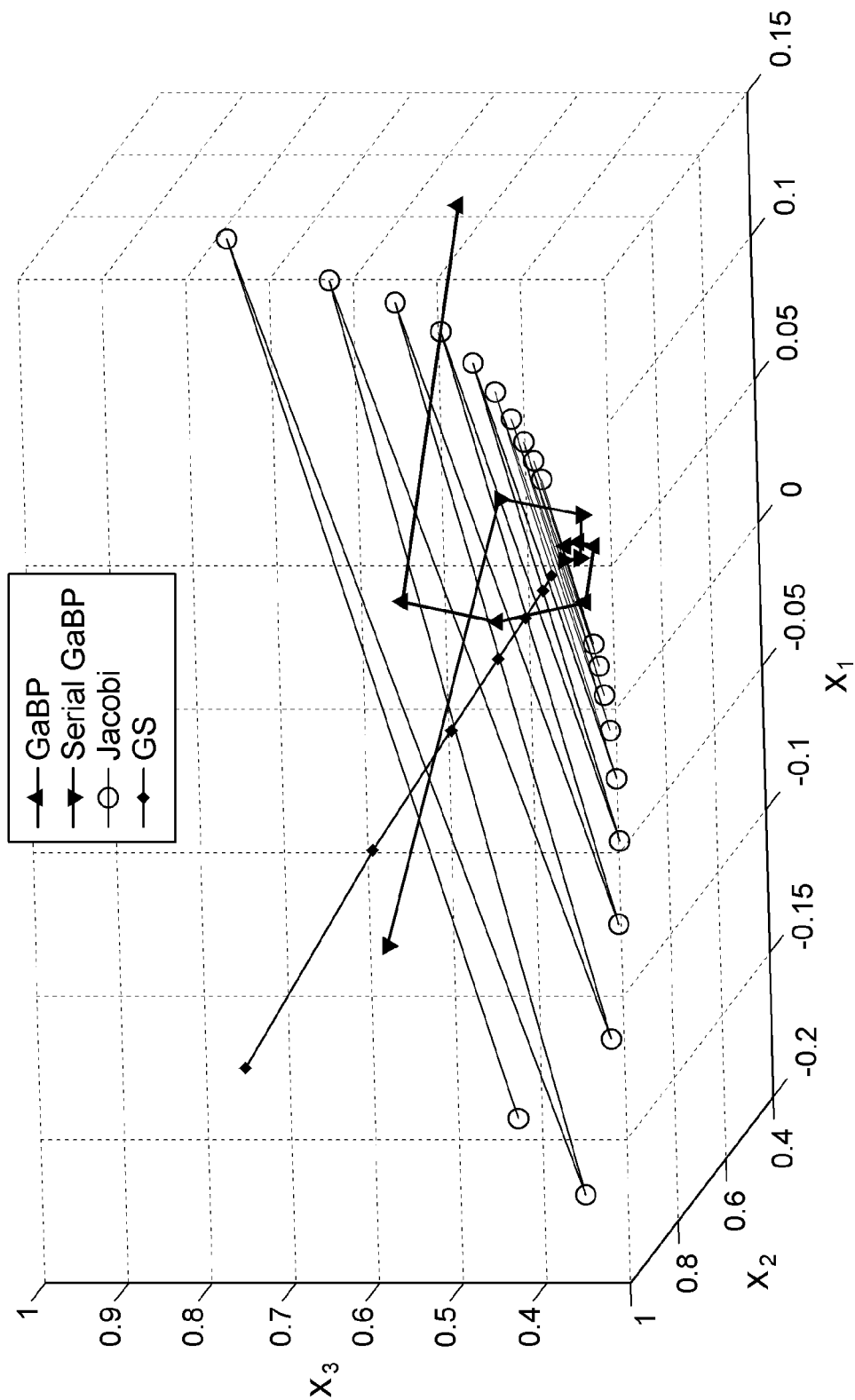
FIG. 5 shows convergence contours for iterations for various solver algorithms.
Figure 6:
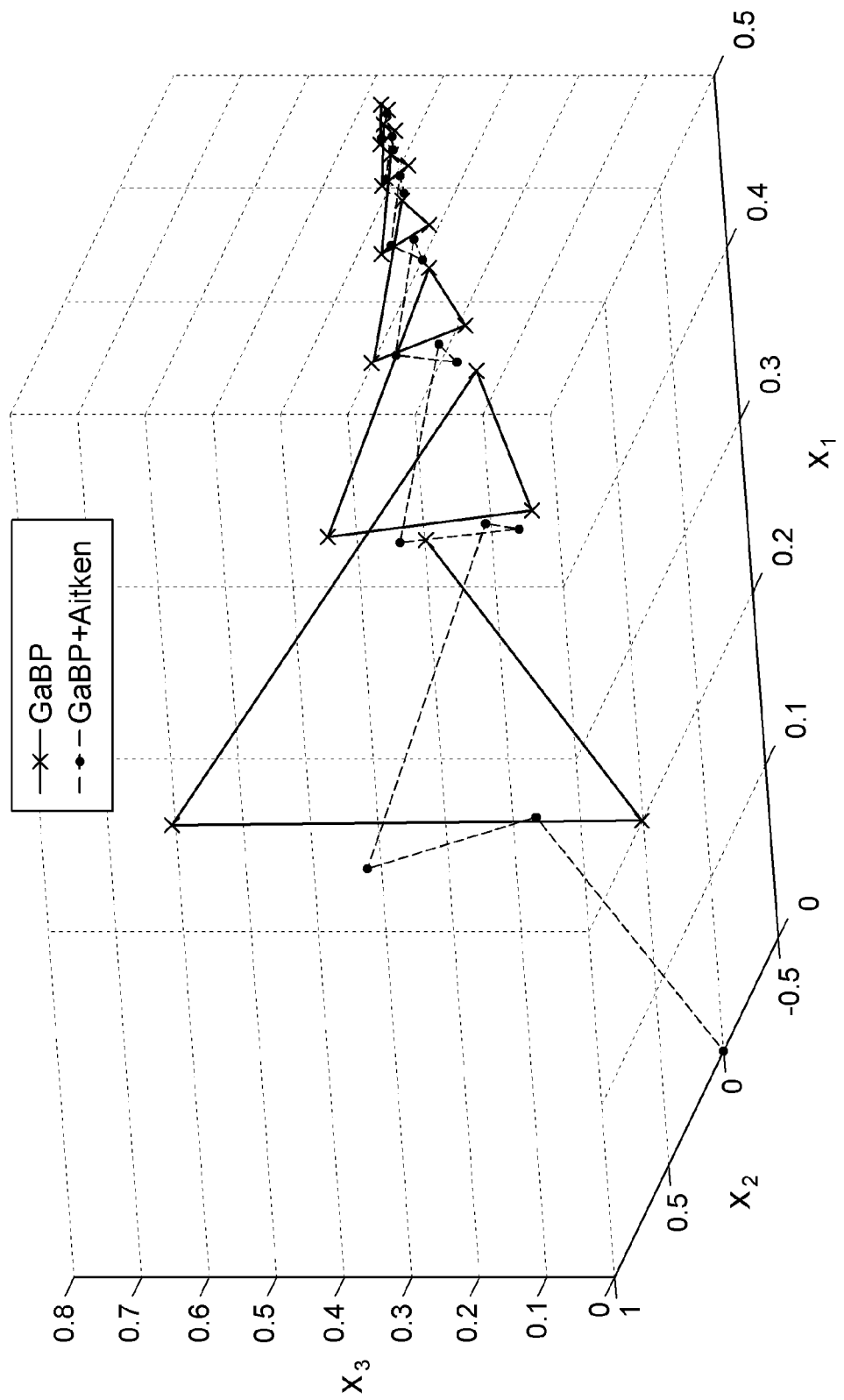
FIG. 6 shows a convergence visualization of GaBP versus accelerated GaBP using a Jacobi algorithm, according to an embodiment of the present invention.

An interesting question concerns the origin of this convergence speed-up associated with GaBP. Better understanding may be gained by visualizing the iterations of the different methods for the matrix $R_3$ case. The convergence contours are plotted in the space of $\{x_1, x_2, x_3\}$ in FIG. 5. As expected, the Jacobi algorithm converges in zigzags towards the fixed point. The fastest algorithm is serial GaBP. GaBP convergence is in a spiral shape, suggesting that despite the overall convergence improvement, performance improvement is not guaranteed in successive iteration rounds. The spiral nature of GaBP convergence is better viewed in FIG. 6. In this case, the system was simulated with a certain R matrix for which Jacobi algorithm and other standard methods did not converge. Using Aitken's method, a further speed-up in GaBP convergence is obtained.

Despite the fact that examples of small systems are described herein, these illustrate typical behavior of various algorithms. GaBP has been exponentially shown to converge in a logarithmic number of iterations in the cases of very large matrices both dense (e.g., with up to hundreds of thousands of dimensions) and sparse (e.g., with up to millions of dimensions).

Example embodiments of the present invention using GaBP for linear detection allow for a distributed implementation of the linear detector, circumventing the need of (potentially cumbersome) direct matrix inversion, such as via Gaussian elimination. Example GaBP methods can yield faster convergence than many conventional methods.

For particular example GaBP methods, the input matrix $R_{n\times n} = S_{n\times k}^T S_{k\times n}$ (the chip correlation matrix) is computed prior to running the algorithm. This computation requires $n^2 k$ operations. In the case where the matrix S is sparse, the matrix R might no longer be sparse. Further, an example GaBP method uses $2n^2$ memory to store the messages. For a large n, this could be prohibitive.

An alternative method according to embodiments of the present invention is provided to address these issues. In this alternative method, given a non-rectangular CDMA matrix $S_{n\times k}$, an MMSE detector $x=(S^T S + \Psi)^{-1} S^T y$ is computed where $\Psi$ is the AWGN diagonal covariance matrix. An example GaBP algorithm, which is an efficient distribution algorithm, is utilized. Construction according to this example embodiment uses only 2nk memory for storing the messages. When k<<n this represents significant saving relative to the $2n^2$ in the example GaBP algorithm described above. Furthermore, $S^T S$ need not be explicitly computed, saving an additional $n^2 k$ overhead.

Again, consider a discrete-time channel with a real input vector $x = \{x_1, \ldots, x_K\}^T$ governed by an arbitrary prior distribution, $P_x$, and a corresponding real output vector $y = \{y_1, \ldots, y_K\}^T = f\{x\}^T \in \mathbb{R}^K$. Here, the function $f\{\cdot\}$ denotes the channel transformation. By definition, linear detection compels the decision rule to be $$\hat{x} = \Delta\{x^*\} = \Delta\{A^{-1}b\},$$

where $b=y$ is the $K\times 1$ observation vector and the $K\times K$ matrix A is a positive-definite symmetric matrix approximating the channel transformation. The vector $x^*$ is the solution (over $\mathbb{R}$) to $Ax=b$. Estimation is completed by adjusting the (inverse) matrix-vector product to the input alphabet, dictated by $P_x$, accomplished by using a proper clipping function $\Delta\{\cdot\}$ (e.g., for binary signaling $\Delta\{\cdot\}$ is the sign function).

For example, linear channels are characterized by the linear relation $$y = f\{x\} = Rx + n,$$

where n is a K×1 additive noise vector and $R=S^TS$ is a positive-definite symmetric matrix, often known as the correlation matrix. The N×N matrix S describes the physical channel medium, while the vector y corresponds to the output of a bank of filters matched to the physical channel S.

Assuming linear channels with AWGN with variance $\sigma^2$ as the ambient noise, the general linear equation rule can describe known linear detectors. For example:

The conventional matched filter (MF) detector is obtained by taking $A \triangleq I_K$ and b=y. This detector is optimal, in the MAP-sense, for the case of zero cross-correlations, i.e., $R=I_K$, as happens for orthogonal CDMA or when there is not ISI effect.

The decorrelator (zero forcing equalizer) is achieved by substituting $$A \triangleq R$$

and b=y. It is optimal in the noiseless case.

The linear minimum mean-square error (MMSE) detector can also be described by using $A=R+\sigma^2 I_K$. This detector is known to be optimal when the input distribution is Gaussian.

In general, linear detection is suboptimal because of its deterministic underlying mechanism (i.e., solving a given set of linear equations), in contrast to other estimation schemes, such as MAP or maximum likelihood, that emerge from an optimization criterion.

In the example method described above, linear detection, in its general form, was implemented using an efficient message-passing algorithm. The linear detection problem was shifted from an algebraic to a probabilistic domain. Instead of solving a deterministic vector-matrix linear equation, an inference problem is solved in a graphical model describing a certain Gaussian distribution function. Given the overall channel matrix R and the observation vector y, one knows how to write explicitly p(x) and the corresponding graph G with edge potentials ('compatibility functions') $\psi_{ij}$ and self-potentials ('evidence') $\phi_i$. These graph potentials are determined according to the following pairwise factorization of the Gaussian distribution p(x)

$$p(x) \propto \Pi_{i=1}^K \phi_i(x_i) \Pi_{\{i,j\}} \psi_{ij}(x_i, x_j),$$

resulting in $$\psi_{ij}(x_i, x_j) \triangleq \exp(-x_i R_{ij} x_j)$$

and $\phi_i(x_i)=\exp(b_i x_i - R_{ii} x_i^2/2)$. The set of edges {i,j} corresponds to the set of all non-zero entries of A for which i>j. Hence, it is useful to calculate the marginal densities, which must also be Gaussian, $p(x_i) \sim N(\mu_i=\{R^{-1}y\}_i, P_i^{-1}=\{R^{-1}\}_{ii})$, where $\mu_i$ and $P_i$ are the marginal mean and inverse variance (a.k.a. precision), respectively. It is shown that the inferred mean μ is identical to the desired solution $x^*=R^{-1}y$. Table 6 lists the example GaBP algorithm rules in this embodiment.

TABLE 6

| # | Stage | Operation |
|---|---|---|
| 1. | Initialize | Compute $P_{ii} = A_{ii}$ and $\mu_{ii} = b_i/A_{ii}$. Set $P_{ki} = 0$ and $\mu_{ki} = 0$, $\forall k \neq i$. |

TABLE 6-continued

| # | Stage | Operation |
|---|---|---|
| 2. | Iterate | Propagate $P_{ki}$ and $\mu_{ki}$, $\forall k \neq i$ such that $A_{ki} \neq 0$. Compute $P_{i\backslash j} = P_{ii} + \Sigma_{k \in N(i)\backslash j} P_{ki}$ and $\mu_{i\backslash j} = P_{i\backslash j}^{-1}(P_{ii}\mu_{ii} + \Sigma_{k \in N(i)\backslash j} P_{ki}\mu_{ki})$. Compute $P_{ij} = -A_{ij}P_{i\backslash j}^{-1}A_{ji}$ and $\mu_{ij} = -P_{ij}^{-1}A_{ij}\mu_{i\backslash j}$. |
| 3. | Check | If $P_{ij}$ and $\mu_{ij}$ did not converge, return to #2. Else, continue to #4. |
| 4. | Infer | $P_i = P_{ii} + \Sigma_{k \in N(i)} P_{ki}$, $\mu_i = P_i^{-1}(P_{ii}\mu_{ii} + \Sigma_{k \in N(i)} P_{ki}\mu_{ki})$. |
| 5. | Decide | $\hat{x}_i = \Delta\{\mu_i\}$ |

The applicability of the example GaBP-based solver can be extended for systems with symmetric matrices to systems with any square (i.e., also nonsymmetric) or rectangular matrix. First, a new symmetric data matrix $\tilde{R}$ is constructed based on an arbitrary (non-rectangular) matrix $S \in \mathbb{R}^{k \times n}$ $$\tilde{R} \triangleq \begin{pmatrix} I_k & S^T \\ S & -\Psi \end{pmatrix} \in \mathbb{R}^{(k+n) \times (k+n)}.$$

Additionally, a new vector of variables $$\tilde{x} \triangleq \{\hat{x}^T, Z^T\}^T \in \mathbb{R}^{(k+n) \times 1}$$

is defined, where $\hat{x} \in \mathbb{R}^{k \times 1}$ is the (to be shown) solution vector and $z \in \mathbb{R}^{n \times 1}$ is an auxiliary hidden vector, and a new observation vector $$\tilde{y} \triangleq \{0^T, y^T\}^T \in \mathbb{R}^{(k+n) \times 1}.$$

Next, it is shown that solving the symmetric linear system $\tilde{R}\tilde{x}=\tilde{y}$ and taking the first k entries of the corresponding solution vector $\tilde{x}$ is equivalent to solving the original (not necessarily symmetric) system Rx=y. Note that in the new construction the matrix $\tilde{R}$ is sparse again, and has only 2nk messages, instead of $n^2$ in the previous example construction.

Writing explicitly the symmetric linear system's equations, one gets $$\hat{x}+S^T z=0, S\hat{x}-\Psi z=y.$$

Thus, $$\hat{x}=\Psi^{-1}S^T(y-S\hat{x}),$$

and extracting $\hat{x}$ provides $$\hat{x}=(S^T S+\Psi)^{-1}S^T y.$$

Note that when the noise level is zero, $\Psi=0_{m \times m}$, one gets the Moore-Penrose pseudoinverse solution $$\hat{x}=(S^T S)^{-1}S^T y=S^\dagger y.$$

A relation of this alternative method to a factor graph is provided. Given the inverse covariance matrix $\tilde{R}$ defined above, and the shift vector $\tilde{x}$, one can derive the matching self and edge potentials $$\psi_{ij}(x_i, x_j) \triangleq \exp(-x_i R_{ij} x_j)$$

$$\phi_i(x_i) \triangleq \exp(-1/2 x_i R_{ii}^2 x_i - x_i y_i)$$

which is a factorization of the Gaussian distribution $$p(x) \propto \prod_i \phi_i(x_i) \prod_{i,j} \psi_{ij}(x_i, x_j) =$$

$$= \prod_{i \leq k} \phi_i(x_i) \prod_{i > k} \phi_i(x_i) \prod_{i,j} \psi_{ij}(x_i, x_j) =$$

$$= \prod_{i \leq k} \overbrace{\exp\left(-\frac{1}{2}x_i^2\right)}^{\text{prior on } x} \prod_{i > k} \exp\left(-\frac{1}{2}\psi_i x_i^2 - x_i y_i\right) \prod_{i,j} \exp\left(-x_i \frac{R_{ij}}{S_{ij}} x_j\right)$$

Figure 7:
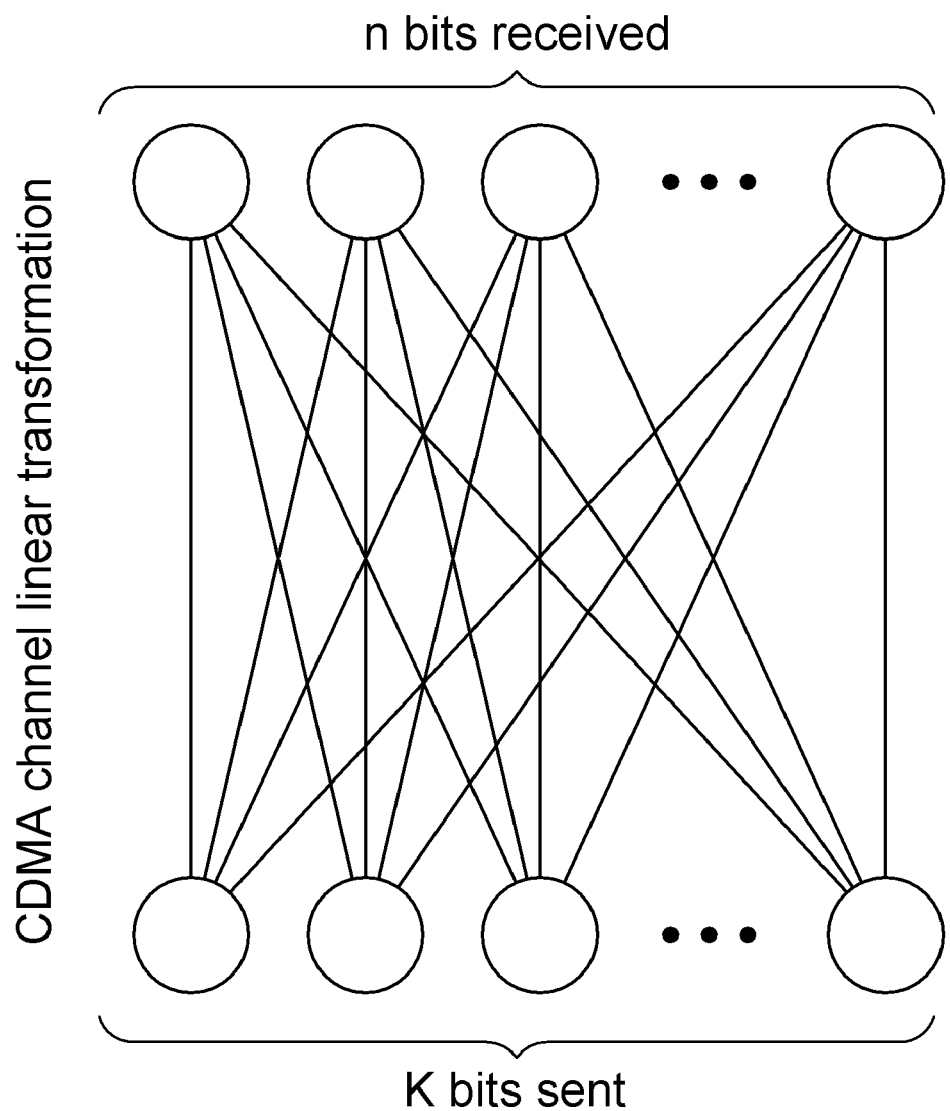
FIG. 7 is a factor graph showing a linear channel relating to an example GaBP algorithm according to an embodiment of the present invention.

To show the relation of this construction is shown to a factor graph, a factor graph is used with k nodes to the left (the bits transmitted) and n nodes to the right (the signal received), shown in FIG. 7. Using the definition $$\tilde{x} \triangleq \{\hat{x}^T, z^T\}^T \in \mathbb{R}^{(k+n) \times 1}$$

the vector $\hat{x}$ represents the k input bits and the vector z represents the signal received. Now, the system probability can be written as $$p(\tilde{x}) \propto \int_{\hat{x}} N(\hat{x}; 0, I) N(z; S\hat{x}, \Psi) d\hat{x}$$

It is known that the marginal distribution over z is:

$$= N(z; 0, S^T S + \Psi)$$

This distribution is Gaussian, with the following parameters:

$$E(z|\hat{x}) = (S^T S + \Psi)^{-1} S^T y$$

$$Cov(z|\hat{x}) = (S^T S + \Psi)^{-1}$$

One of the benefits of this alternative construction is that a mechanism is provided for other convergence results. It is known that if the matrix $\tilde{R}$ is strictly diagonally dominant, then GaBP converges and the marginal means converge to the true means. Noting that the matrix $\tilde{R}$ is symmetric, one can determine the applicability of this condition by examining its columns. Referring to "Efficient Bayesian inference for learning in the Ising linear perceptron and signal detection in CDMA", Physica A., vol. 365, pp. 203-210, February 2006, it is seen that in the first k columns, the k CDMA sequences are present. Random-spreading binary CDMA sequences are assumed, which are normalized to one. In other words, the absolute sum of each column is $\sqrt{n}$. In that case, the matrix $\tilde{R}$ is not diagonally dominant (DD). One can add a regularization term of $\sqrt{n} + \epsilon$ to force the matrix $\tilde{R}$ to be DD, but there is a cost in changing the problem. In the next n columns of the matrix $\tilde{R}$, the diagonal covariance matrix $\Psi$ is present with different noise levels per bit in the main diagonal, and zero elsewhere. The absolute sum of each column of S is $k/\sqrt{n}$, thus when the noise level of each bit satisfies $\psi_i = k/\sqrt{n}$, one has a convergence guarantee. Note that the convergence condition is a sufficient condition. It can also be determined (e.g., see A. Montanari, B. Prabhakar, and D. Tse, "Belief propagation based multi-user detection", in Proc. 43th Allerton Conf. on Communications, Control and Computing, Monticello, Ill., USA, September 2005) that in the large system limit, the example algorithm converges for binary signaling, even in the absence of noise.

Again, though this alternative algorithm is referred to herein using the example of CDMA multiuser detection, it has wider applicability. As a nonlimiting example, an algorithm according to embodiments of the present invention can provide an efficient iterative method for computing the Monroe-Penrose pseudoinverse, and it can also be applied to the factor analysis learning problem.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A processing method comprising:
   receiving a signal over at least one antenna corresponding to an input vector y that represents a noisy observation of Ax, where A is a data matrix and x is a vector of unknown variables;
   recovering x from said received input vector y via an iterative method;
   wherein said recovering comprises determining an inference of a vector of marginal means over a graph G, where the graph G is of a joint Gaussian probability density function p(x) associated with noise in said received input vector y.

2. The processing method of claim 1, wherein the graph G comprises a graph relating x to noise determined from input vector y.

3. The processing method of claim 2, wherein the graph G comprises a set of continuous variable nodes that are in one-to-one correspondence with the vector x, and a set of undirected edges between the variables nodes that is determined by non-zero entries of the data matrix A.

4. The processing method of claim 3, wherein the graph G comprises a joint Gaussian probability p(x) having a mean that is an average value for the vector x and a precision that is an inverse of a variance of values of the vector x.

5. The processing method of claim 4, wherein the graph G comprises a joint Gaussian probability $$p(x) \sim \mathcal{N}\left(\mu \triangleq A^{-1} y, A^{-1}\right),$$

where N indicates a normal distribution.

6. The processing method of claim 3, wherein said recovering comprises iteratively converging on a marginal mean and inverse variance of p(x).

7. The method of claim 1, wherein said recovering x comprises determining an approximation of an inverse matrix $A^{-1}y$.

8. The method of claim 1, wherein said recovering x comprises determining an approximation of a pseudo inverse solution $(A'A)^{-1}A'y$.

9. The method of claim 1, wherein said receiving a signal further comprises:
   filtering said received signal.

10. The method of claim 1, wherein the data matrix A is based on a spreading code matrix N×K, where N is a spreading code length and K is a number of users.

11. The method of claim 1, wherein the data matrix A is based on a channel path matrix m>l, where m is a number of antennas receiving the signal, and l is the number of transmitting antennas.

12. The method of claim 1, wherein the data matrix A is based on a K×K system matrix for orthogonal frequency division multiplexing, and where K is a vector length of information bits.

13. The method of claim 1, wherein the data matrix A is based on a correlation matrix of interference in time.

14. A method of processing a signal comprising:
receiving a signal at an antenna corresponding to an input vector r=Sx+n, where r is an N-length vector of received samples at the antenna, S is an N×K spreading code matrix, x is a message vector, and n is a noise vector;
filtering said received signal by a matched filter;
recovering x based on said filtered signal;
wherein said recovering x comprises determining an inference of a vector of marginal means over a graph G, where the graph G is of a joint Gaussian probability density function p(x) associated with noise in said filtered signal.

15. The method of claim 14, wherein said filtered signal corresponds to a vector y=Rx+z, wherein R comprises a spreading code cross-correlation matrix, and wherein z comprises a K-length colored noise vector.

16. A method of processing a signal comprising:
receiving a signal at an antenna corresponding to an input vector r=Sx+n, where r is an N-length vector of received samples at the antenna, S is an N×K spreading code matrix, x is a message vector, and n is a noise vector;
filtering said received signal by a matched filter;
recovering x based on said filtered signal;
wherein said recovering x comprises determining an inference of a vector of marginal means over a graph G, where the graph G is of a joint Gaussian probability density function p(x) associated with noise in said filtered signal;
wherein said filtered signal corresponds to a vector y=Rx+z, wherein R comprises a spreading code cross-correlation matrix, and wherein z comprises a K-length colored noise vector;
wherein said recovering x comprises decorrelating said filtered signal.

17. A method of processing a signal comprising:
receiving a signal at an antenna corresponding to an input vector r=Sx+n, where r is an N-length vector of received samples at the antenna, S is an N×K spreading code matrix, x is a message vector, and n is a noise vector;
filtering said received signal by a matched filter;
recovering x based on said filtered signal;
wherein said recovering x comprises determining an inference of a vector of marginal means over a graph G, where the graph G is of a joint Gaussian probability density function p(x) associated with noise in said filtered signal;
wherein said filtered signal corresponds to a vector y=Rx+z, wherein R comprises a spreading code cross-correlation matrix, and wherein z comprises a K-length colored noise vector;
wherein the graph G comprises a graph relating x to noise determined from vector y.

18. The processing method of claim 17, wherein the graph G comprises a graph (x, $\epsilon$), where x is a set of continuous variable nodes that are in one-to-one correspondence with x, and where $\epsilon$ is a set of undirected edges determined by non-zero entries of the spreading code cross-correlation matrix R.

19. The processing method of claim 18, wherein the graph G comprises a joint Gaussian probability p(x) having a mean that is an average value for the vector x and a precision that is an inverse of a variance of values of the vector x.

20. The processing method of claim 19, wherein the graph G comprises a joint Gaussian probability $$p(x) \sim \mathcal{N}\left(\mu \triangleq R^{-1}y, R^{-1}\right).$$

21. The processing method of claim 18, wherein said recovering comprises iteratively converging on a marginal mean and inverse variance of p(x).

22. A method of processing a signal from l transmitting antennas, the method comprising:
receiving a signal at m receiving antennas corresponding to an input vector r=Hx+n, where r is an m-length vector of received samples at the m antennas, H is an m×l matrix, x is a message vector, and n is a noise vector;
filtering said received signal by a matched filter;
recovering x based on said filtered signal;
wherein said recovering x comprises determining an inference of a vector of marginal means over a graph G, where the graph G is of a joint Gaussian probability density function p(x) associated with noise in said filtered signal.

23. The method of claim 22, wherein said filtered signal corresponds to a vector y=Rx+z, wherein R comprises a spreading code cross-correlation matrix of a channel, and wherein z comprises an m-length colored noise vector.

24. The processing method of claim 22, wherein the graph G comprises a joint Gaussian probability p(x) having a mean that is an average value for the vector x and a precision that is an inverse of a variance of values of the vector x.

25. The processing method of claim 24, wherein the graph G comprises a joint Gaussian probability $$p(x) \sim \mathcal{N}\left(\mu \triangleq R^{-1}y, R^{-1}\right),$$

where R is a correlation matrix.

26. The processing method of claim 22, wherein said recovering comprises iteratively converging on a marginal mean and inverse variance of p(x).

27. A method of processing a signal from l transmitting antennas, the method comprising:
receiving a signal at m receiving antennas corresponding to an input vector r=Hx+n, where r is an m-length vector of received samples at the m antennas, H is an m×l matrix, x is a message vector, and n is a noise vectors
filtering said received signal by a matched filter;
recovering x based on said filtered signal;
wherein said recovering x comprises determining an inference of a vector of marginal means over a graph G, where the graph G is of a joint Gaussian probability density function p(x) associated with noise in said filtered signal;
wherein said filtered signal corresponds to a vector y=Rx+z, wherein R comprises a spreading code cross-correlation matrix of a channel, and wherein z comprises an m-length colored noise vector;
wherein the graph G comprises a graph relating x to noise determined from vector y.

28. The method of claim 27, wherein the graph G comprises a graph (x,$\epsilon$), where x is a set of continuous variable nodes that are in one-to-one correspondence with x, and where $\epsilon$ is a set of undirected edges determined by non-zero entries of the spreading code cross-correlation matrix R.

29. A device for processing a received signal comprising:
   at least one antenna configured for receiving the signal corresponding to an input vector y that represents a noisy observation of Ax, where A is a data matrix and x is a vector of unknown variables; and
   a processor configured to perform recovering x from said received input vector y via an iterative method;
   wherein said recovering comprises determining an inference of a vector of marginal means over a graph G, where the graph G is of a joint Gaussian probability density function p(x) associated with noise in said received input vector y.

30. A device for processing a signal, the device comprising:
   at least one antenna configured for receiving the signal corresponding to an input vector r=Sx+n, where r is an N-length vector of received samples at the antenna, S is an N×K spreading code matrix, x is a message vector, and n is a noise vector;
   at least one matched filter configured for filtering said received signal; and
   a processor configured for recovering x based on said filtered signal;
   wherein said recovering x comprises determining an inference of a vector of marginal means over a graph G, where the graph G is of a joint Gaussian probability density function p(x) associated with noise in said filtered signal.

31. A device for processing a signal from l transmitting antennas, the device comprising:
   at least m receiving antennas configured for receiving the signal corresponding to an input vector r=Hx+n, where r is an m-length vector of received samples at the m antennas, H is an m×l matrix, x is a message vector, and n is a noise vector;
   at least one matched filter configured for filtering said received signal; and
   a processor configured for recovering x based on said filtered signal;
   wherein said recovering x comprises determining an inference of a vector of marginal means over a graph G, where the graph G is of a joint Gaussian probability density function p(x) associated with noise in said filtered signal.

32. A device for processing a signal, the device comprising:
   at least one antenna configured for receiving the signal corresponding to an input vector r=Sx+n, where r is an N-length vector of received samples at the antenna, S is an N×K spreading code matrix, x is a message vector, and n is a noise vector;
   at least one matched filter configured for filtering said received signal; and
   a processor configured for recovering x based on said filtered signal;
   wherein said recovering x comprises determining an inference of a vector of marginal means over a graph G, where the graph G is of a joint Gaussian probability density function p(X) associated with noise in said filtered signal;
   wherein said filtered signal corresponds to a vector Y=Rx+z, wherein R comprises a spreading code cross-correlation matrix, and wherein z comprises a K-length colored noise vector;
   wherein said recovering x comprises decorrelating said filtered signal.

33. A device for processing a signal, the device comprising:
   at least one antenna configured for receiving the signal corresponding to an input vector r=Sx+n, where r is an N-length vector of received samples at the antenna, S is an N×K spreading code matrix, x is a message vector, and n is a noise vector;
   at least one matched filter configured for filtering said received signal; and
   a processor configured for said recovering x based on said filtered signal;
   wherein said recovering x comprises determining an inference of a vector of marginal means over a graph G, where the graph G is of a joint Gaussian probability density function p(x) associated with noise in said filtered signal;
   wherein said filtered signal corresponds to a vector Y=Rx+z, wherein R comprises a spreading code cross-correlation matrix, and wherein z comprises a K-length colored noise vector;
   wherein the graph G comprises a graph relating x to noise determined from vector y.

34. A device for processing a signal from l transmitting antennas, the device comprising:
   at least one antenna configured for receiving the signal corresponding to an input vector r=Hx+n, where r is an m-length vector of received samples at the m antennas, H is an m×l matrix, x is a message vector, and n is a noise vector;
   at least one matched filter configured for filtering said received signal; and
   a processor configured for recovering x based on said filtered signal;
   wherein said recovering x comprises determining an inference of a vector of marginal means over a graph G, where the graph G is of a joint Gaussian probability density function p(x) associated with noise in said filtered signal.

* * * * *

UNITED STATES PATENT AND TRADEMARK OFFICE
CERTIFICATE OF CORRECTION

PATENT NO. : 8,139,656 B2  
APPLICATION NO. : 12/238197  
DATED : March 20, 2012  
INVENTOR(S) : Ori Shental et al.

It is certified that error appears in the above-identified patent and that said Letters Patent is hereby corrected as shown below:

In the Claims:

Col. 22, line 65  After "path matrix", please delete "m>1" and insert --$m \times l$-- therefor.  
Claim 11

Col. 24, line 49  After "vectors", please insert --;--.  
Claim 27

Col. 25, line 31  Before "receiving", please delete "m" and insert --one-- therefor.  
Claim 31

Signed and Sealed this  
First Day of October, 2013

Teresa Stanek Rea  
*Deputy Director of the United States Patent and Trademark Office*